(12) United States Patent
Maksymczuk et al.

(10) Patent No.: US 9,589,316 B1
(45) Date of Patent: Mar. 7, 2017

(54) BI-DIRECTIONAL MORPHING OF TWO-DIMENSIONAL SCREEN-SPACE PROJECTIONS

(71) Applicant: Intel Corporation, Santa Clara, CA (US)

(72) Inventors: Tomasz Maksymczuk, Gdansk (PL); Tomasz Poniecki, Gdynia (PL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/004,396

(22) Filed: Jan. 22, 2016

(51) Int. Cl.
*G06T 15/00* (2011.01)
*H04N 13/00* (2006.01)
*G06T 3/00* (2006.01)
*G06T 17/10* (2006.01)

(52) U.S. Cl.
CPC .......... *G06T 3/0031* (2013.01); *G06T 15/005* (2013.01); *G06T 17/10* (2013.01)

(58) Field of Classification Search
None
See application file for complete search history.

(56) References Cited

U.S. PATENT DOCUMENTS

| | | | |
|---|---|---|---|
| 5,222,205 A * | 6/1993 | Larson | G06T 15/04 345/587 |
| 6,438,275 B1 | 8/2002 | Martins et al. | |
| 6,967,659 B1 * | 11/2005 | Jayavant | G06T 1/20 345/505 |
| 8,570,362 B2 * | 10/2013 | Park | H04N 13/0029 345/428 |
| 2005/0094869 A1 * | 5/2005 | Yoda | H04N 7/0135 382/154 |
| 2007/0146358 A1 * | 6/2007 | Ijzerman | H04N 13/0404 345/419 |
| 2009/0079743 A1 * | 3/2009 | Pearson | G06T 15/205 345/473 |
| 2010/0157024 A1 * | 6/2010 | Park | H04N 13/0029 348/51 |

OTHER PUBLICATIONS

Non Final Office Action received for U.S. Appl. No. 14/746,937, mailed on Nov. 3, 2016, 14 pages.

* cited by examiner

*Primary Examiner* — Ashish K Thomas
(74) *Attorney, Agent, or Firm* — Forefront IP Lawgroup of Christie and Rivera, PLLC

(57) ABSTRACT

Described herein are technologies that facilitate computationally low-intensity creation of additional frames in a sequence of frames created by real-time three-dimensional (3D) rendering. More particularly, the technologies described herein generate an interposed two-dimensional (2D) screen-space projection (e.g., the resulting rendered image) in between a pair of fully rendered surrounding frames in a sequence of rendered frames. The interposed 2D screen-space projection is generated based upon information derived from the pair of surrounding frames.

20 Claims, 18 Drawing Sheets

BI-DIRECTIONAL MORPHING OF TWO-DIMENSIONAL SCREEN-SPACE PROJECTIONS

BACKGROUND

In the realm of computer graphics, three-dimensional (3D) scene rendering is the 3D computer graphics process of automatically converting 3D wire frame models into two-dimensional (2D) images (i.e., frames or screen-space) with 3D photorealistic effects or non-photorealistic rendering on a computer or video-game system.

Rendering for Interactive media (e.g., games and simulations) is calculated and displayed in real time, at rates of approximately 20 to 120 frames per second. In real-time rendering, the goal is to show as much information as possible as the eye can process in a fraction of a second. For example, with 30 frame-per-second, a frame is just one 30th of a second.

Typically, a real-time computer graphics system seeks to achieve as high as possible degree of photorealism at an acceptable minimum rendering speed. Real-time rendering is often polygonal (e.g., triangles) and aided by the computer's GPU.

Unfortunately, 3D scene rendering is computationally intensive. It seems that the industry's state-of-the-art graphics hardware (e.g., graphics processing unit (GPU)) struggles to keep up with the expectations of realism and the demands of the graphics programmer. That hottest new video games push the envelope on the capability of the hardware to successfully render successive 3D scenes in real-time and at a frame rate (i.e., pictures per second) that users/viewers expect.

BRIEF DESCRIPTION OF THE DRAWINGS

The Detailed Description references the accompanying figures. In the figures, the left-most digit(s) of a reference number identifies the figure in which the reference number first appears. The same numbers are used throughout the drawings to reference like features and components.

DETAILED DESCRIPTION

Figure 1:
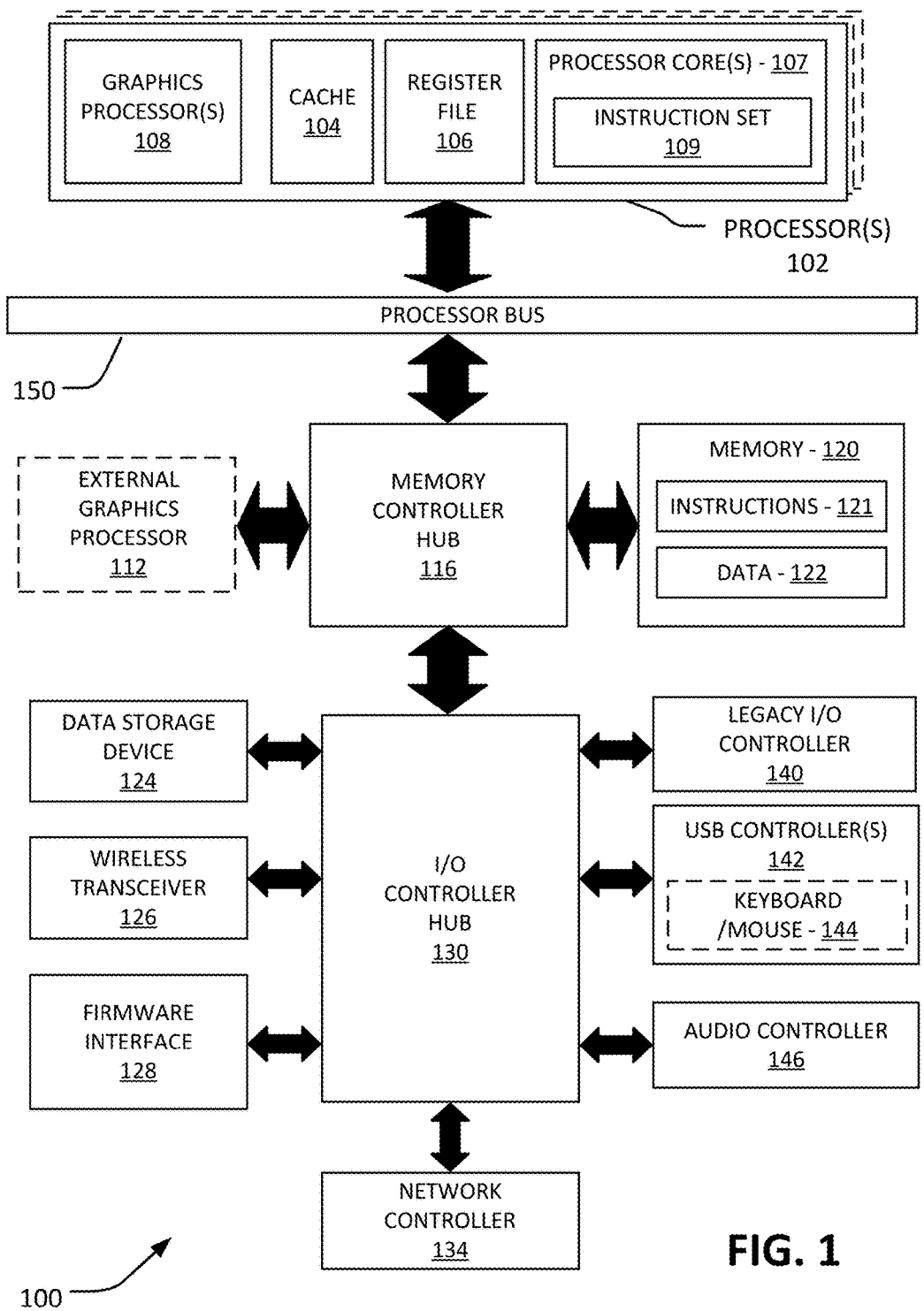
FIG. 1 is a block diagram of a data processing system according to an embodiment.

Described herein are technologies that facilitate computationally low-intensity creation of additional frames in a sequence of frames created by real-time 3D rendering. More particularly, the technologies described herein generate an interposed 2D screen-space projection (e.g., the resulting rendered image) in between a pair of fully rendered surrounding frames in a sequence of rendered frames. The interposed 2D screen-space projection is generated based upon information derived from the pair of surrounding frames. The surrounding frames include a "before" (i.e., preceding) frame and an "after" (i.e., succeeding) frame.

Consider, for example, a ten-second sequence of frames at sixty frames per second. To accomplish this using conventional approaches, each of the 600 frames of the sequence must be fully 3D rendered. However, with the new technologies described herein, only a fraction (e.g., half (300), third (200), quarter (150)) of the frames of the sequence are fully 3D rendered. The frames that are not fully 3D rendered are, instead, generated based upon information derived from surrounding frames (which were fully 3D rendered) and interposed between their associated surrounding frames. That is, the frames that are not fully 3D rendered are interleaved between the fully rendered frames to form the full 600 frame sequence.

The calculations of the interposed frame generation operate primarily in the 2D screen-space projection (rather than with the 3D space). Because of that, the computational load of the interposed-frame generation is significantly less than the computational burden of 3D rendering the same frame. Also, the computational load is reduced because the original pixel shaders used for rendering the fully-rendered frames are not executed with the intermediate frames. Instead, for at least one implementation, a minimal morphing shader has used that copies two color values and writes a weighted sum of those to the output. Per-pixel processing is significantly reduced.

The generation of the interposed frames is accomplished, for example, by metamorphosing (i.e., morphing) a new 2D screen-space projection from the surrounding frames. The morphing uses information about the projected triangles of the 3D geometry model of at least two surrounding frames. Those surrounding frames typically are the immediately preceding frame and the immediately succeeding frame of a sequence. This geometric model information is used to calculate an anticipated change in the projected triangles between the surrounding frames.

Next, the calculated triangles are colored (or shaded) based upon the corresponding information from the surrounding frames. In this way, the distance-based weighted blending of pixel color information from the preceding and the succeeding frames is used to provide a good approximation of surface lighting and/or special effect change in the morphed frame being inserted.

Herein, the computational savings is primarily achieved by replacing—for some fraction of the frames of a sequence—the massive number of calculations in the 3D space as required by 3D rendering with a substantially smaller number of calculations in the 2D space as used by morphing new 2D screen-space projection from surrounding already 3D rendered frames. Indeed, in addition to the 3D geometry processing that is partially avoided with this new technology, there are a massive number of calculations that are avoided that occur in 2D space within pixel shaders that compute pixel colors for the triangles' 2D projections (i.e., pixel shading works in 2D).

The aggressiveness of implementations of this new technology can be controlled by varying the ratio of morphed frames to fully rendered frames in the output stream. Most likely, a lower fill rate (e.g., one morph frame inserted between each pair of fully rendered frames) would be effective for highly interactive applications, like video games. Conversely, a higher fill rate (e.g., multiple morphed frames inserted between each pair of fully rendered frames) would be effective for low interactive applications, like movie-like sequences. In some implementations, the amount of object motion and/or level of interactivity may be detected and/or provided. A determination or indication of the-the object motion and/or level of interactivity may determine the fill rate (e.g., rate of interleaving morphed frames) of a frame sequence.

System Overview

FIG. 1 is a block diagram of a processing system 100, according to an embodiment. In various embodiments the system 100 includes one or more processors 102 and one or more graphics processors 108, and may be a single processor desktop system, a multiprocessor workstation system, or a server system having a large number of processors 102 or processor cores 107. In on embodiment, the system 100 is a processing platform incorporated within a system-on-a-chip (SoC) integrated circuit for use in mobile, handheld, or embedded devices.

An embodiment of system 100 can include, or be incorporated within a server-based gaming platform, a game console, including a game and media console, a mobile gaming console, a handheld game console, or an online game console. In some embodiment system 100 is a mobile phone, smart phone, tablet computing device or mobile Internet device. Data processing system 100 can also include, couple with, or be integrated within a wearable device, such as a smart watch wearable device, smart eyewear device, augmented reality device, or virtual reality device. In some embodiments, data processing system 100 is a television or set top box device having one or more processors 102 and a graphical interface generated by one or more graphics processors 108.

In some embodiments, the one or more processors 102 each include one or more processor cores 107 to process instructions which, when executed, perform operations for system and user software. In some embodiments, each of the one or more processor cores 107 is configured to process a specific instruction set 109. In some embodiments, instruction set 109 may facilitate Complex Instruction Set Computing (CISC), Reduced Instruction Set Computing (RISC), or computing via a Very Long Instruction Word (VLIW). Multiple processor cores 107 may each process a different instruction set 109, which may include instructions to facilitate the emulation of other instruction sets. Processor core 107 may also include other processing devices, such a Digital Signal Processor (DSP).

In some embodiments, the processor 102 includes cache memory 104. Depending on the architecture, the processor 102 can have a single internal cache or multiple levels of internal cache. In some embodiments, the cache memory is shared among various components of the processor 102. In some embodiments, the processor 102 also uses an external cache (e.g., a Level-3 (L3) cache or Last Level Cache (LLC)) (not shown), which may be shared among processor cores 107 using known cache coherency techniques. A register file 106 is additionally included in processor 102 which may include different types of registers for storing different types of data (e.g., integer registers, floating point registers, status registers, and an instruction pointer register). Some registers may be general-purpose registers, while other registers may be specific to the design of the processor 102.

In some embodiments, processor 102 is coupled to a processor bus 110 to transmit communication signals such as address, data, or control signals between processor 102 and other components in system 100. In one embodiment the system 100 uses an exemplary 'hub' system architecture, including a memory controller hub 116 and an Input Output (I/O) controller hub 130. A memory controller hub 116 facilitates communication between a memory device and other components of system 100, while an I/O Controller Hub (ICH) 130 provides connections to I/O devices via a local I/O bus. In one embodiment, the logic of the memory controller hub 116 is integrated within the processor.

Memory device 120 can be a dynamic random access memory (DRAM) device, a static random access memory (SRAM) device, flash memory device, phase-change memory device, or some other memory device having suitable performance to serve as process memory. In one embodiment the memory device 120 can operate as system memory for the system 100, to store data 122 and instructions 121 for use when the one or more processors 102 executes an application or process. Memory controller hub 116 also couples with an optional external graphics processor 112, which may communicate with the one or more graphics processors 108 in processors 102 to perform graphics and media operations.

In some embodiments, ICH 130 enables peripherals to connect to memory device 120 and processor 102 via a high-speed I/O bus. The I/O peripherals include, but are not limited to, an audio controller 146, a firmware interface 128, a wireless transceiver 126 (e.g., Wi-Fi, Bluetooth), a data storage device 124 (e.g., hard disk drive, flash memory, etc.), and a legacy I/O controller 140 for coupling legacy (e.g., Personal System 2 (PS/2)) devices to the system. One or more Universal Serial Bus (USB) controllers 142 connect input devices, such as keyboard and mouse 144 combinations. A network controller 134 may also couple to ICH 130. In some embodiments, a high-performance network controller (not shown) couples to processor bus 110. It will be appreciated that the system 100 shown is exemplary and not limiting, as other types of data processing systems that are differently configured may also be used. For example, the I/O controller hub 130 may be integrated within the one or more processor 102, or the memory controller hub 116 and I/O controller hub 130 may be integrated into a discreet external graphics processor, such as the external graphics processor 112.

Figure 2:
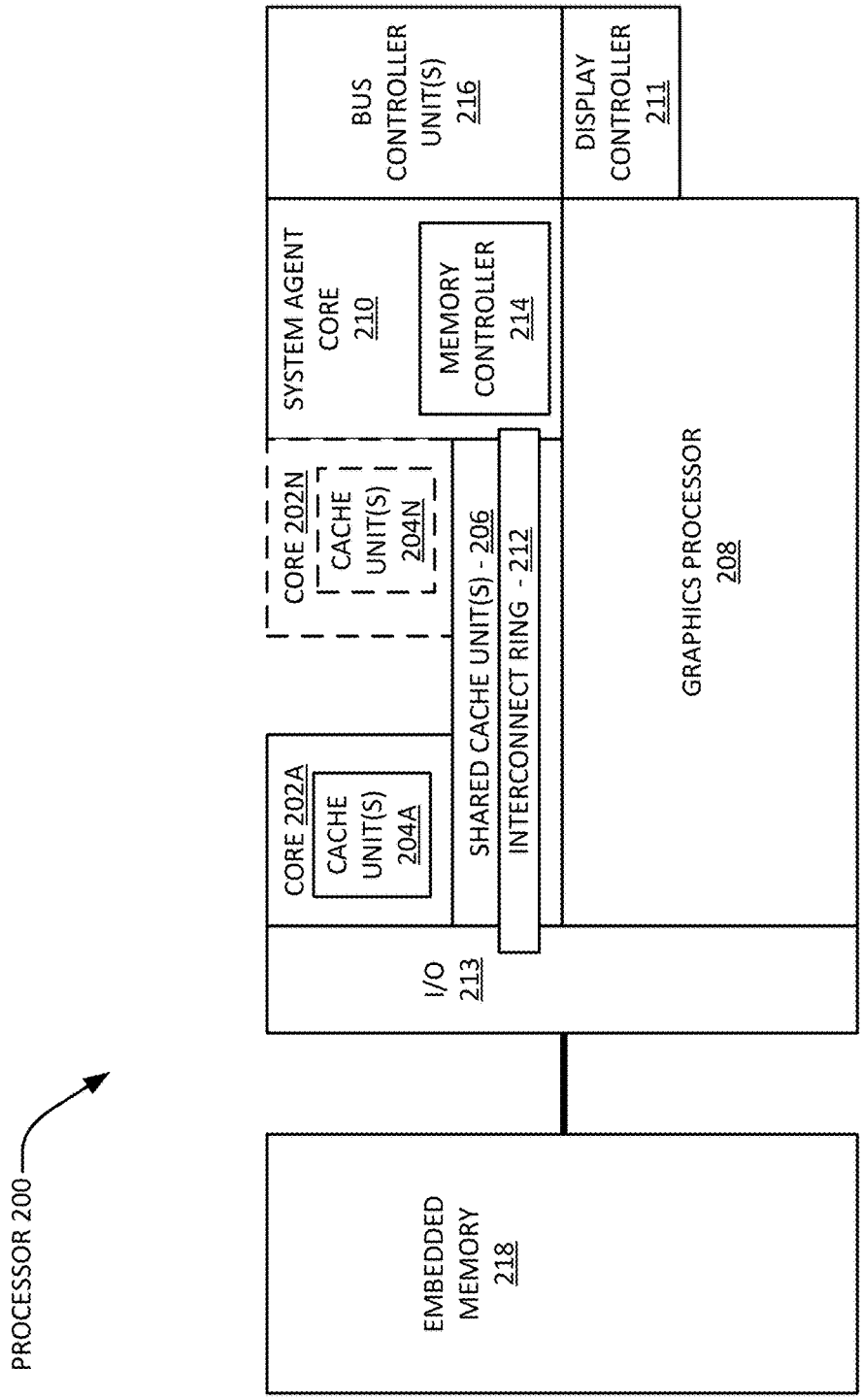
FIG. 2 is a block diagram of an embodiment of a processor having one or more processor cores, an integrated memory controller, and an integrated graphics processor.

FIG. 2 is a block diagram of an embodiment of a processor 200 having one or more processor cores 202A-202N, an integrated memory controller 214, and an integrated graphics processor 208. Those elements of FIG. 2 having the same reference numbers (or names) as the elements of any other figure herein can operate or function in any manner similar to that described elsewhere herein, but are not limited to such. Processor 200 can include additional cores up to and including additional core 202N represented by the dashed lined boxes. Each of processor cores 202A-202N includes one or more internal cache units 204A-204N. In some embodiments each processor core also has access to one or more shared cached units 206.

The internal cache units 204A-204N and shared cache units 206 represent a cache memory hierarchy within the processor 200. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 206 and 204A-204N.

In some embodiments, processor 200 may also include a set of one or more bus controller units 216 and a system agent core 210. The one or more bus controller units 216 manage a set of peripheral buses, such as one or more Peripheral Component Interconnect buses (e.g., PCI, PCI Express). System agent core 210 provides management functionality for the various processor components. In some embodiments, system agent core 210 includes one or more integrated memory controllers 214 to manage access to various external memory devices (not shown).

In some embodiments, one or more of the processor cores 202A-202N include support for simultaneous multi-threading. In such embodiment, the system agent core 210 includes components for coordinating and operating cores 202A-202N during multi-threaded processing. System agent core 210 may additionally include a power control unit (PCU), which includes logic and components to regulate the power state of processor cores 202A-202N and graphics processor 208.

In some embodiments, processor 200 additionally includes graphics processor 208 to execute graphics processing operations. In some embodiments, the graphics processor 208 couples with the set of shared cache units 206, and the system agent core 210, including the one or more integrated memory controllers 214. In some embodiments, a display controller 211 is coupled with the graphics processor 208 to drive graphics processor output to one or more coupled displays. In some embodiments, display controller 211 may be a separate module coupled with the graphics processor via at least one interconnect, or may be integrated within the graphics processor 208 or system agent core 210.

In some embodiments, a ring based interconnect unit 212 is used to couple the internal components of the processor 200. However, an alternative interconnect unit may be used, such as a point-to-point interconnect, a switched interconnect, or other techniques, including techniques well known in the art. In some embodiments, graphics processor 208 couples with the ring interconnect 212 via an I/O link 213.

The exemplary I/O link 213 represents at least one of multiple varieties of I/O interconnects, including an on package I/O interconnect which facilitates communication between various processor components and a high-performance embedded memory module 218, such as an eDRAM module. In some embodiments, each of the processor cores 202-202N and graphics processor 208 use embedded memory modules 218 as a shared Last Level Cache.

In some embodiments, processor cores 202A-202N are homogenous cores executing the same instruction set architecture. In another embodiment, processor cores 202A-202N are heterogeneous in terms of instruction set architecture (ISA), where one or more of processor cores 202A-N execute a first instruction set, while at least one of the other cores executes a subset of the first instruction set or a different instruction set. In one embodiment processor cores 202A-202N are heterogeneous in terms of microarchitecture, where one or more cores having a relatively higher power consumption couple with one or more power cores having a lower power consumption. Additionally, processor 200 can be implemented on one or more chips or as an SoC integrated circuit having the illustrated components, in addition to other components.

Figure 3:
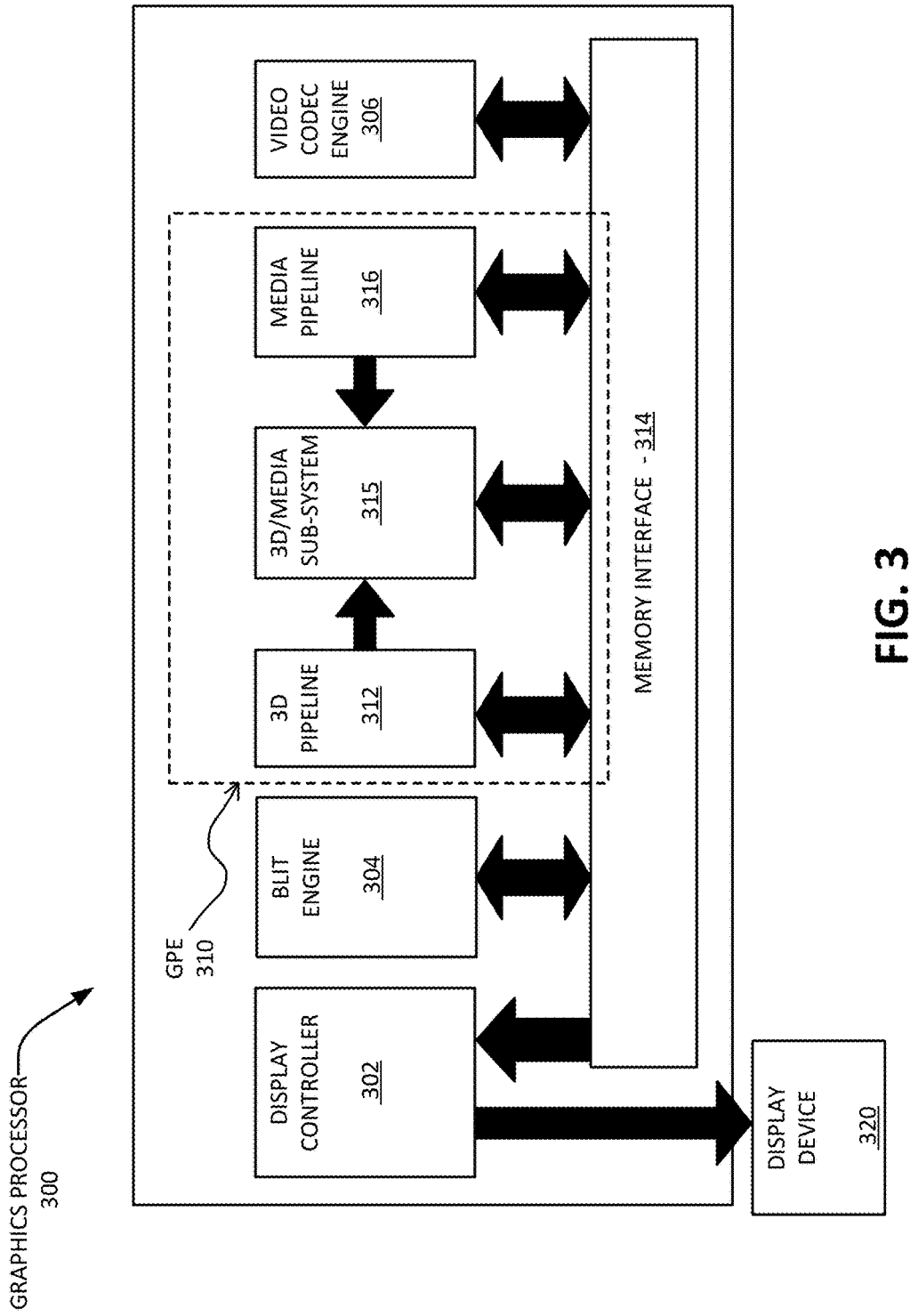
FIG. 3 is a block diagram of one embodiment of a graphics processor which may be a discrete graphics processing unit, or may be graphics processor integrated with a plurality of processing cores.

FIG. 3 is a block diagram of a graphics processor 300, which may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 300 includes a memory interface 314 to access memory. Memory interface 314 can be an interface to local memory, one or more internal caches, one or more shared external caches, and/or to system memory.

In some embodiments, graphics processor 300 also includes a display controller 302 to drive display output data to a display device 320. Display controller 302 includes hardware for one or more overlay planes for the display and composition of multiple layers of video or user interface elements. In some embodiments, graphics processor 300 includes a video codec engine 306 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In some embodiments, graphics processor 300 includes a block image transfer (BLIT) engine 304 to perform two-dimensional (2D) rasterizer operations including, for example, bit-boundary block transfers. However, in one embodiment, 2D graphics operations are performed using one or more components of graphics processing engine (GPE) 310. In some embodiments, graphics processing engine 310 is a compute engine for performing graphics operations, including three-dimensional (3D) graphics operations and media operations.

In some embodiments, GPE 310 includes a 3D pipeline 312 for performing 3D operations, such as rendering three-dimensional images and scenes using processing functions that act upon 3D primitive shapes (e.g., rectangle, triangle, etc.). The 3D pipeline 312 includes programmable and fixed function elements that perform various tasks within the element and/or spawn execution threads to a 3D/Media sub-system 315. While 3D pipeline 312 can be used to perform media operations, an embodiment of GPE 310 also includes a media pipeline 316 that is specifically used to perform media operations, such as video post-processing and image enhancement.

In some embodiments, media pipeline 316 includes fixed function or programmable logic units to perform one or more specialized media operations, such as video decode acceleration, video de-interlacing, and video encode acceleration in place of, or on behalf of video codec engine 306. In some embodiments, media pipeline 316 additionally includes a thread spawning unit to spawn threads for execution on 3D/Media sub-system 315. The spawned threads perform computations for the media operations on one or more graphics execution units included in 3D/Media subsystem 315.

In some embodiments, 3D/Media subsystem 315 includes logic for executing threads spawned by 3D pipeline 312 and media pipeline 316. In one embodiment, the pipelines send thread execution requests to 3D/Media subsystem 315, which includes thread dispatch logic for arbitrating and dispatching the various requests to available thread execution resources. The execution resources include an array of graphics execution units to process the 3D and media threads. In some embodiments, 3D/Media subsystem 315 includes one or more internal caches for thread instructions and data. In some embodiments, the subsystem also includes shared memory, including registers and addressable memory, to share data between threads and to store output data.

3D/Media Processing

Figure 4:
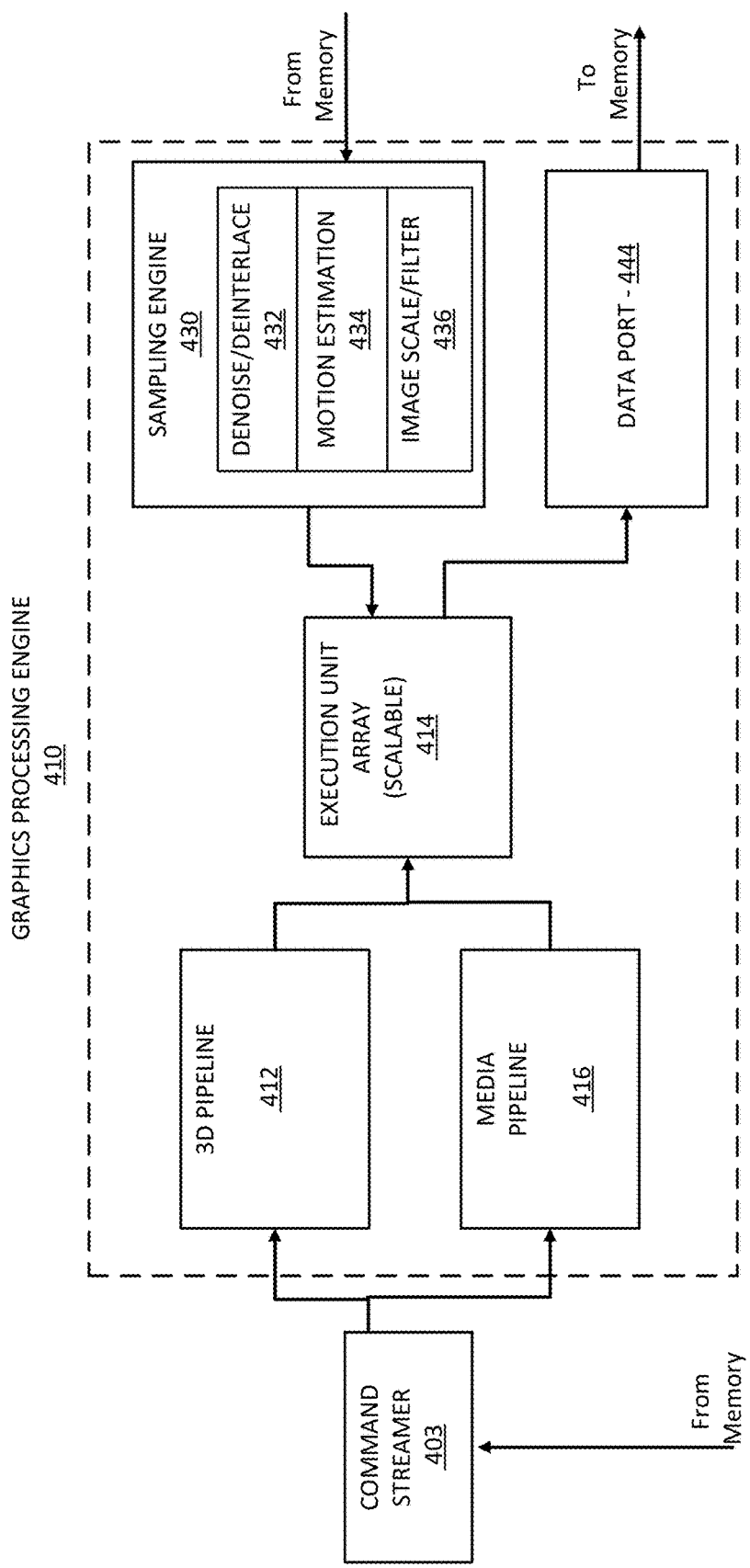
FIG. 4 is a block diagram of an embodiment of a graphics processing engine for a graphics processor.

FIG. 4 is a block diagram of a graphics processing engine 410 of a graphics processor in accordance with some embodiments. In one embodiment, the GPE 410 is a version of the GPE 310 shown in FIG. 3. Elements of FIG. 4 having the same reference numbers (or names) as the elements of any other figure herein can operate or function in any manner similar to that described elsewhere herein, but are not limited to such.

In some embodiments, GPE 410 couples with a command streamer 403, which provides a command stream to the GPE 3D and media pipelines 412, 416. In some embodiments, command streamer 403 is coupled to memory, which can be system memory, or one or more of internal cache memory and shared cache memory. In some embodiments, command streamer 403 receives commands from the memory and sends the commands to 3D pipeline 412 and/or media pipeline 416. The commands are directives fetched from a ring buffer, which stores commands for the 3D and media pipelines 412, 416. In one embodiment, the ring buffer can additionally include batch command buffers storing batches of multiple commands. The 3D and media pipelines 412, 416 process the commands by performing operations via logic within the respective pipelines or by dispatching one or more execution threads to an execution unit array 414. In some embodiments, execution unit array 414 is scalable, such that the array includes a variable number of execution units based on the target power and performance level of GPE 410.

In some embodiments, a sampling engine 430 couples with memory (e.g., cache memory or system memory) and execution unit array 414. In some embodiments, sampling engine 430 provides a memory access mechanism for execution unit array 414 that allows execution array 414 to read graphics and media data from memory. In some embodiments, sampling engine 430 includes logic to perform specialized image sampling operations for media.

In some embodiments, the specialized media sampling logic in sampling engine 430 includes a de-noise/de-interlace module 432, a motion estimation module 434, and an image scaling and filtering module 436. In some embodiments, de-noise/de-interlace module 432 includes logic to perform one or more of a de-noise or a de-interlace algorithm on decoded video data. The de-interlace logic combines alternating fields of interlaced video content into a single fame of video. The de-noise logic reduces or removes data noise from video and image data. In some embodiments, the de-noise logic and de-interlace logic are motion adaptive and use spatial or temporal filtering based on the amount of motion detected in the video data. In some embodiments, the de-noise/de-interlace module 432 includes dedicated motion detection logic (e.g., within the motion estimation engine 434).

In some embodiments, motion estimation engine 434 provides hardware acceleration for video operations by performing video acceleration functions such as motion vector estimation and prediction on video data. The motion estimation engine determines motion vectors that describe the transformation of image data between successive video frames. In some embodiments, a graphics processor media codec uses video motion estimation engine 434 to perform operations on video at the macro-block level that may otherwise be too computationally intensive to perform with a general-purpose processor. In some embodiments, motion estimation engine 434 is generally available to graphics processor components to assist with video decode and processing functions that are sensitive or adaptive to the direction or magnitude of the motion within video data.

In some embodiments, image scaling and filtering module 436 performs image-processing operations to enhance the visual quality of generated images and video. In some embodiments, scaling and filtering module 436 processes image and video data during the sampling operation before providing the data to execution unit array 414.

In some embodiments, the GPE 410 includes a data port 444, which provides an additional mechanism for graphics subsystems to access memory. In some embodiments, data port 444 facilitates memory access for operations including render target writes, constant buffer reads, scratch memory space reads/writes, and media surface accesses. In some embodiments, data port 444 includes cache memory space to cache accesses to memory. The cache memory can be a single data cache or separated into multiple caches for the multiple subsystems that access memory via the data port (e.g., a render buffer cache, a constant buffer cache, etc.). In some embodiments, threads executing on an execution unit in execution unit array 414 communicate with the data port by exchanging messages via a data distribution interconnect that couples each of the sub-systems of GPE 410.

Execution Units

Figure 5:
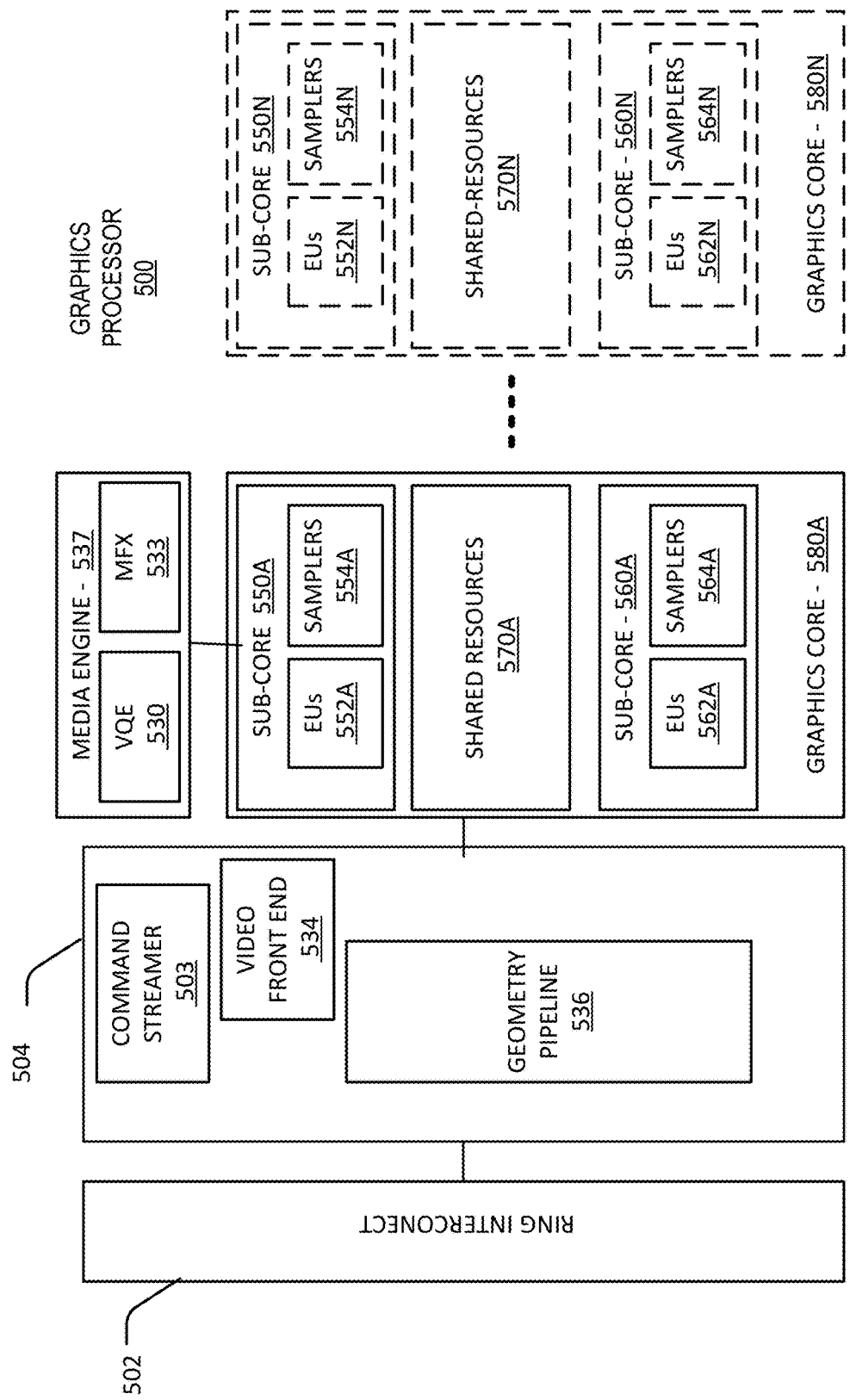
FIG. 5 is a block diagram of another embodiment of a graphics processor.

FIG. 5 is a block diagram of another embodiment of a graphics processor 500. Elements of FIG. 5 having the same reference numbers (or names) as the elements of any other figure herein can operate or function in any manner similar to that described elsewhere herein, but are not limited to such.

In some embodiments, graphics processor 500 includes a ring interconnect 502, a pipeline front-end 504, a media engine 537, and graphics cores 580A-580N. In some embodiments, ring interconnect 502 couples the graphics processor to other processing units, including other graphics processors or one or more general-purpose processor cores. In some embodiments, the graphics processor is one of many processors integrated within a multi-core processing system.

In some embodiments, graphics processor 500 receives batches of commands via ring interconnect 502. The incoming commands are interpreted by a command streamer 503 in the pipeline front-end 504. In some embodiments, graphics processor 500 includes scalable execution logic to perform 3D geometry processing and media processing via the graphics core(s) 580A-580N. For 3D geometry processing commands, command streamer 503 supplies commands to geometry pipeline 536. For at least some media processing commands, command streamer 503 supplies the commands to a video front end 534, which couples with a media engine 537. In some embodiments, media engine 537 includes a Video Quality Engine (VQE) 530 for video and image post-processing and a multi-format encode/decode (MFX) 533 engine to provide hardware-accelerated media data encode and decode. In some embodiments, geometry pipeline 536 and media engine 537 each generate execution threads for the thread execution resources provided by at least one graphics core 580A.

In some embodiments, graphics processor 500 includes scalable thread execution resources featuring modular cores 580A-580N (sometimes referred to as core slices), each having multiple sub-cores 550A-550N, 560A-560N (sometimes referred to as core sub-slices). In some embodiments, graphics processor 500 can have any number of graphics cores 580A through 580N. In some embodiments, graphics processor 500 includes a graphics core 580A having at least a first sub-core 550A and a second core sub-core 560A. In other embodiments, the graphics processor is a low power processor with a single sub-core (e.g., 550A). In some embodiments, graphics processor 500 includes multiple graphics cores 580A-580N, each including a set of first sub-cores 550A-550N and a set of second sub-cores 560A-560N. Each sub-core in the set of first sub-cores 550A-550N includes at least a first set of execution units 552A-552N and media/texture samplers 554A-554N. Each sub-core in the set of second sub-cores 560A-560N includes at least a second set of execution units 562A-562N and samplers 564A-564N. In some embodiments, each sub-core 550A-550N, 560A-560N shares a set of shared resources 570A-570N. In some embodiments, the shared resources include shared cache memory and pixel operation logic. Other shared resources may also be included in the various embodiments of the graphics processor.

Figure 6:
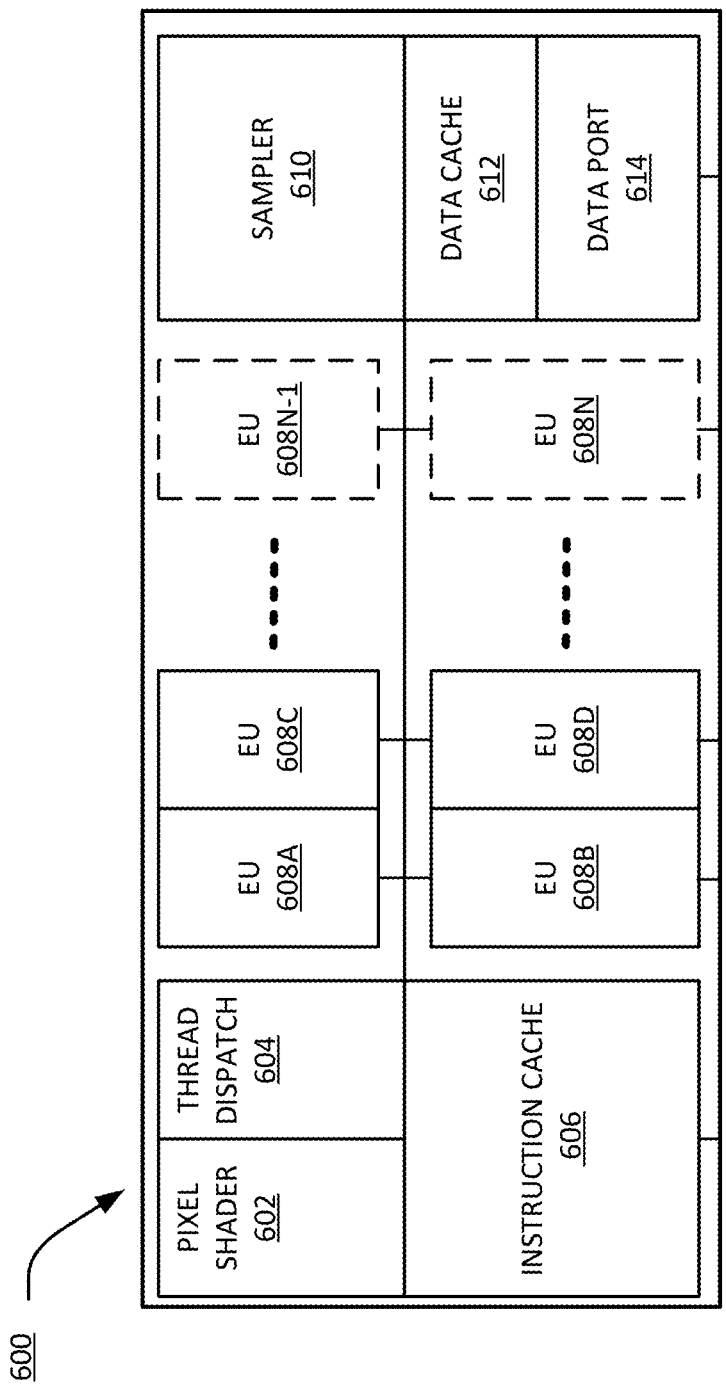
FIG. 6 illustrates thread execution logic including an array of processing elements employed in one embodiment of a graphics processing engine.

FIG. 6 illustrates thread execution logic 600 including an array of processing elements employed in some embodiments of a GPE. Elements of FIG. 6 having the same reference numbers (or names) as the elements of any other figure herein can operate or function in any manner similar to that described elsewhere herein, but are not limited to such.

In some embodiments, thread execution logic 600 includes a pixel shader 602, a thread dispatcher 604, instruction cache 606, a scalable execution unit array including a plurality of execution units 608A-608N, a sampler 610, a data cache 612, and a data port 614. In one embodiment the included components are interconnected via an interconnect fabric that links to each of the components. In some embodiments, thread execution logic 600 includes one or more connections to memory, such as system memory or cache memory, through one or more of instruction cache 606, data port 614, sampler 610, and execution unit array 608A-608N. In some embodiments, each execution unit (e.g. 608A) is an individual vector processor capable of executing multiple simultaneous threads and processing multiple data elements in parallel for each thread. In some embodiments, execution unit array 608A-608N includes any number individual execution units.

In some embodiments, execution unit array 608A-608N is primarily used to execute "shader" programs. In some embodiments, the execution units in array 608A-608N execute an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders).

Each execution unit in execution unit array 608A-608N operates on arrays of data elements. The number of data elements is the "execution size," or the number of channels for the instruction. An execution channel is a logical unit of execution for data element access, masking, and flow control within instructions. The number of channels may be independent of the number of physical Arithmetic Logic Units (ALUs) or Floating Point Units (FPUs) for a particular graphics processor. In some embodiments, execution units 608A-608N support integer and floating-point data types.

The execution unit instruction set includes single instruction multiple data (SIMD) instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, different vector widths and register sizes are possible.

One or more internal instruction caches (e.g., 606) are included in the thread execution logic 600 to cache thread instructions for the execution units. In some embodiments, one or more data caches (e.g., 612) are included to cache thread data during thread execution. In some embodiments, sampler 610 is included to provide texture sampling for 3D operations and media sampling for media operations. In some embodiments, sampler 610 includes specialized texture or media sampling functionality to process texture or media data during the sampling process before providing the sampled data to an execution unit.

During execution, the graphics and media pipelines send thread initiation requests to thread execution logic 600 via thread spawning and dispatch logic. In some embodiments, thread execution logic 600 includes a local thread dispatcher 604 that arbitrates thread initiation requests from the graphics and media pipelines and instantiates the requested threads on one or more execution units 608A-608N. For example, the geometry pipeline (e.g., 536 of FIG. 5) dispatches vertex processing, tessellation, or geometry processing threads to thread execution logic 600 (FIG. 6). In some embodiments, thread dispatcher 604 can also process runtime thread spawning requests from the executing shader programs.

Once a group of geometric objects has been processed and rasterized into pixel data, pixel shader 602 is invoked to further compute output information and cause results to be written to output surfaces (e.g., color buffers, depth buffers, stencil buffers, etc.). In some embodiments, pixel shader 602 calculates the values of the various vertex attributes that are to be interpolated across the rasterized object. In some embodiments, pixel shader 602 then executes an application programming interface (API)-supplied pixel shader program. To execute the pixel shader program, pixel shader 602 dispatches threads to an execution unit (e.g., 608A) via thread dispatcher 604. In some embodiments, pixel shader 602 uses texture sampling logic in sampler 610 to access texture data in texture maps stored in memory. Arithmetic operations on the texture data and the input geometry data compute pixel color data for each geometric fragment, or discards one or more pixels from further processing.

In some embodiments, the data port 614 provides a memory access mechanism for the thread execution logic 600 output processed data to memory for processing on a graphics processor output pipeline. In some embodiments, the data port 614 includes or couples to one or more cache memories (e.g., data cache 612) to cache data for memory access via the data port.

Figure 7:
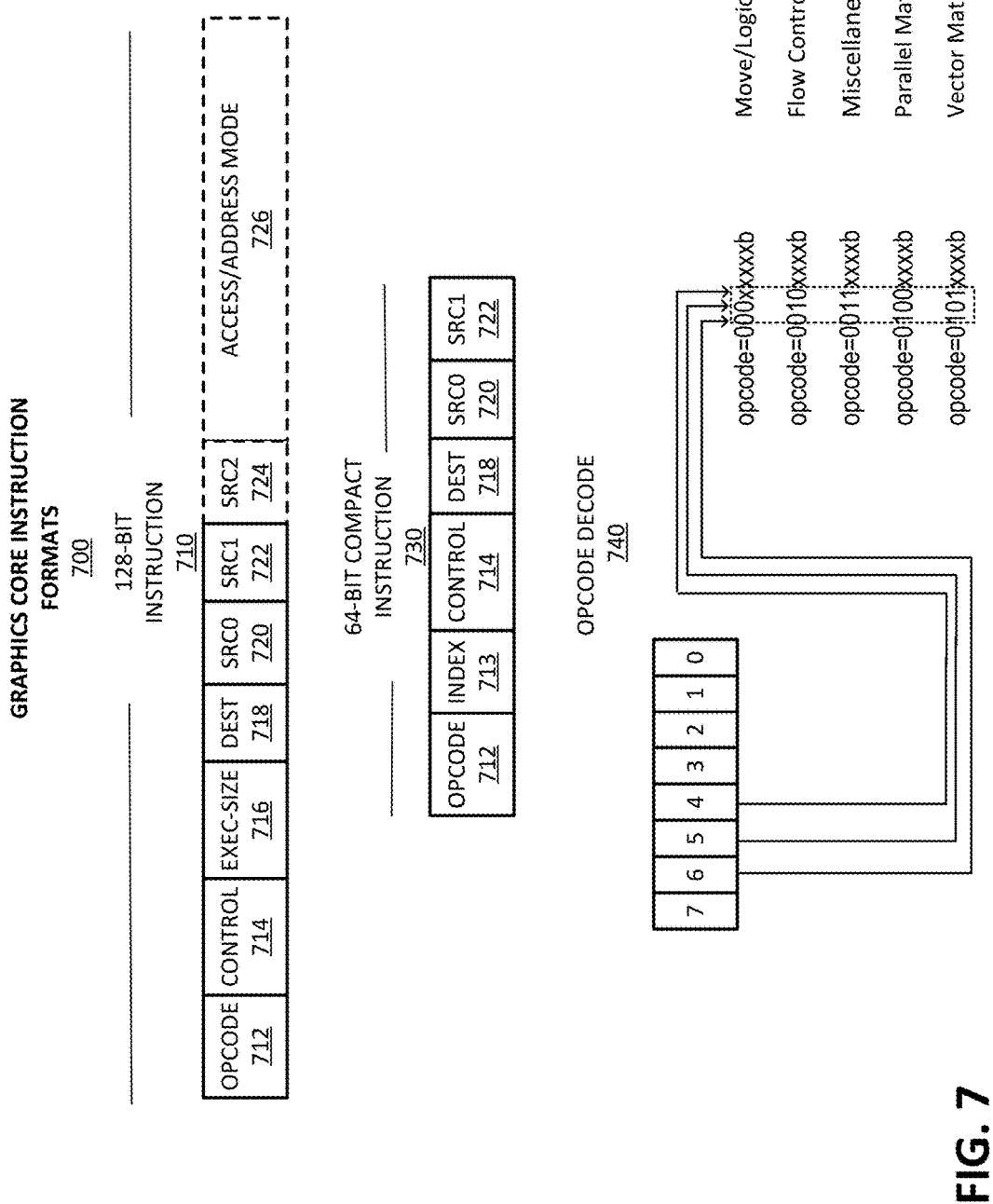
FIG. 7 is a block diagram illustrating a graphics processor execution unit instruction format according to an embodiment.

FIG. 7 is a block diagram illustrating a graphics processor instruction formats 700 according to some embodiments. In one or more embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. In some embodiments, instruction format 700 described and illustrated are macro-instructions, in that they are instructions supplied to the execution unit, as opposed to micro-operations resulting from instruction decode once the instruction is processed.

In some embodiments, the graphics processor execution units natively support instructions in a 128-bit format 710. A 64-bit compacted instruction format 730 is available for some instructions based on the selected instruction, instruction options, and number of operands. The native 128-bit format 710 provides access to all instruction options, while some options and operations are restricted in the 64-bit format 730. The native instructions available in the 64-bit format 730 vary by embodiment. In some embodiments, the instruction is compacted in part using a set of index values in an index field 713. The execution unit hardware references a set of compaction tables based on the index values and uses the compaction table outputs to reconstruct a native instruction in the 128-bit format 710.

For each format, instruction opcode 712 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. In some embodiments, instruction control field 714 enables control over certain execution options, such as channels selection (e.g., predication) and data channel order (e.g., swizzle). For 128-bit instructions 710 an exec-size field 716 limits the number of data channels that will be executed in parallel. In some embodiments, exec-size field 716 is not available for use in the 64-bit compact instruction format 730.

Some execution unit instructions have up to three operands including two source operands, src0 722, src1 722, and one destination 718. In some embodiments, the execution units support dual destination instructions, where one of the destinations is implied. Data manipulation instructions can have a third source operand (e.g., SRC2 724), where the instruction opcode 712 determines the number of source operands. An instruction's last source operand can be an immediate (e.g., hard-coded) value passed with the instruction.

In some embodiments, the 128-bit instruction format 710 includes an access/address mode information 726 specifying, for example, whether direct register addressing mode or indirect register addressing mode is used. When direct register addressing mode is used, the register address of one or more operands is directly provided by bits in the instruction 710.

In some embodiments, the 128-bit instruction format 710 includes an access/address mode field 726, which specifies an address mode and/or an access mode for the instruction. In one embodiment the access mode to define a data access alignment for the instruction. Some embodiments support access modes including a 16-byte aligned access mode and a 1-byte aligned access mode, where the byte alignment of the access mode determines the access alignment of the instruction operands. For example, when in a first mode, the instruction 710 may use byte-aligned addressing for source and destination operands and when in a second mode, the instruction 710 may use 16-byte-aligned addressing for all source and destination operands.

In one embodiment, the address mode portion of the access/address mode field 726 determines whether the instruction is to use direct or indirect addressing. When direct register addressing mode is used bits in the instruction 710 directly provide the register address of one or more operands. When indirect register addressing mode is used, the register address of one or more operands may be computed based on an address register value and an address immediate field in the instruction.

In some embodiments instructions are grouped based on opcode 712 bit-fields to simplify Opcode decode 740. For an 8-bit opcode, bits 4, 5, and 6 allow the execution unit to determine the type of opcode. The precise opcode grouping shown is merely an example. In some embodiments, a move and logic opcode group 742 includes data movement and logic instructions (e.g., move (mov), compare (cmp)). In some embodiments, move and logic group 742 shares the five most significant bits (MSB), where move (mov) instructions are in the form of 0000xxxxb and logic instructions are in the form of 0001xxxxb. A flow control instruction group 744 (e.g., call, jump (jmp)) includes instructions in the form of 0010xxxxb (e.g., 0x20). A miscellaneous instruction group 746 includes a mix of instructions, including synchronization instructions (e.g., wait, send) in the form of 0011xxxxb (e.g., 0x30). A parallel math instruction group 748 includes component-wise arithmetic instructions (e.g., add, multiply (mul)) in the form of 0100xxxxb (e.g., 0x40). The parallel math group 748 performs the arithmetic operations in parallel across data channels. The vector math group 750 includes arithmetic instructions (e.g., dp4) in the form of 0101xxxxb (e.g., 0x50). The vector math group performs arithmetic such as dot product calculations on vector operands.

Graphics Pipeline

Figure 8:
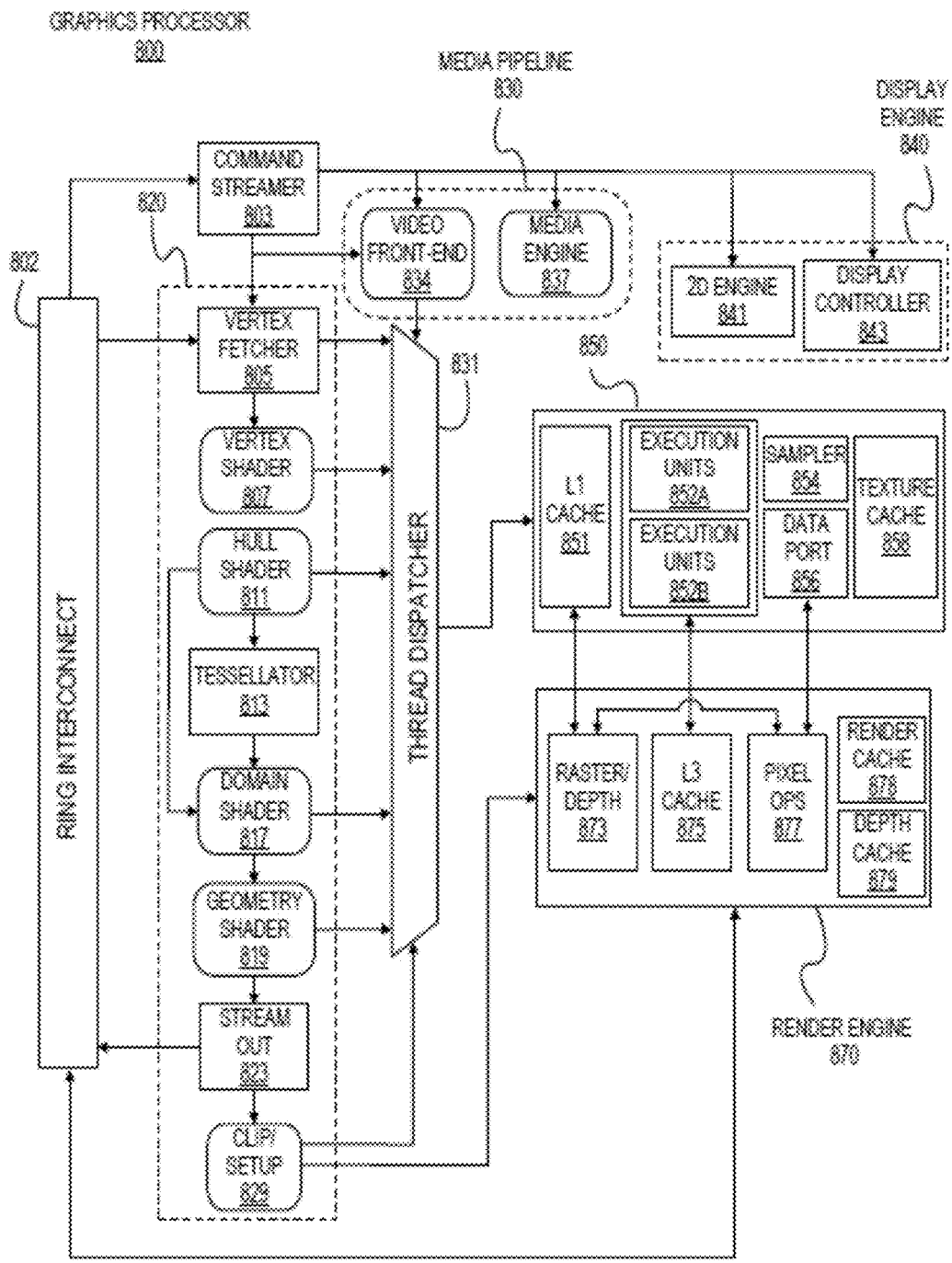
FIG. 8 is a block diagram of another embodiment of a graphics processor which includes a graphics pipeline, a media pipeline, a display engine, thread execution logic, and a render output pipeline.

FIG. 8 is a block diagram of another embodiment of a graphics processor 800. Elements of FIG. 8 having the same reference numbers (or names) as the elements of any other figure herein can operate or function in any manner similar to that described elsewhere herein, but are not limited to such.

In some embodiments, graphics processor 800 includes a graphics pipeline 820, a media pipeline 830, a display engine 840, thread execution logic 850, and a render output pipeline 870. In some embodiments, graphics processor 800 is a graphics processor within a multi-core processing system that includes one or more general purpose processing cores. The graphics processor is controlled by register writes to one or more control registers (not shown) or via commands issued to graphics processor 800 via a ring interconnect 802. In some embodiments, ring interconnect 802 couples graphics processor 800 to other processing components, such as other graphics processors or general-purpose processors. Commands from ring interconnect 802 are interpreted by a command streamer 803, which supplies instructions to individual components of graphics pipeline 820 or media pipeline 830.

In some embodiments, command streamer 803 directs the operation of a vertex fetcher 805 that reads vertex data from memory and executes vertex-processing commands provided by command streamer 803. In some embodiments, vertex fetcher 805 provides vertex data to a vertex shader 807, which performs coordinate space transformation and lighting operations to each vertex. In some embodiments, vertex fetcher 805 and vertex shader 807 execute vertex-processing instructions by dispatching execution threads to execution units 852A, 852B via a thread dispatcher 831.

In some embodiments, execution units 852A, 852B are an array of vector processors having an instruction set for performing graphics and media operations. In some embodiments, execution units 852A, 852B have an attached L1 cache 851 that is specific for each array or shared between the arrays. The cache can be configured as a data cache, an instruction cache, or a single cache that is partitioned to contain data and instructions in different partitions.

In some embodiments, graphics pipeline 820 includes tessellation components to perform hardware-accelerated tessellation of 3D objects. In some embodiments, a programmable hull shader 811 configures the tessellation operations. A programmable domain shader 817 provides back-end evaluation of tessellation output. A tessellator 813 operates at the direction of hull shader 811 and contains special purpose logic to generate a set of detailed geometric objects based on a coarse geometric model that is provided as input to graphics pipeline 820. In some embodiments, if tessellation is not used, tessellation components 811, 813, 817 can be bypassed.

In some embodiments, complete geometric objects can be processed by a geometry shader 819 via one or more threads dispatched to execution units 852A, 852B, or can proceed directly to the clipper 829. In some embodiments, the geometry shader operates on entire geometric objects, rather than vertices or patches of vertices as in previous stages of the graphics pipeline. If the tessellation is disabled the geometry shader 819 receives input from the vertex shader 807. In some embodiments, geometry shader 819 is programmable by a geometry shader program to perform geometry tessellation if the tessellation units are disabled.

Before rasterization, a clipper 829 processes vertex data. The clipper 829 may be a fixed function clipper or a programmable clipper having clipping and geometry shader functions. In some embodiments, a rasterizer/depth 873 in the render output pipeline 870 dispatches pixel shaders to convert the geometric objects into their per pixel representations. In some embodiments, pixel shader logic is included in thread execution logic 850. In some embodiments, an application can bypass the rasterizer 873 and access unrasterized vertex data via a stream out unit 823.

The graphics processor 800 has an interconnect bus, interconnect fabric, or some other interconnect mechanism that allows data and message passing amongst the major components of the processor. In some embodiments, execution units 852A, 852B and associated cache(s) 851, texture and media sampler 854, and texture/sampler cache 858 interconnect via a data port 856 to perform memory access and communicate with render output pipeline components of the processor. In some embodiments, sampler 854, caches 851, 858 and execution units 852A, 852B each have separate memory access paths.

In some embodiments, render output pipeline 870 contains a rasterizer and depth test component 873 that converts vertex-based objects into an associated pixel-based representation. In some embodiments, the rasterizer logic includes a windower/masker unit to perform fixed function triangle and line rasterization. An associated render cache 878 and depth cache 879 are also available in some embodiments. A pixel operations component 877 performs pixel-based operations on the data, though in some instances, pixel operations associated with 2D operations (e.g. bit block image transfers with blending) are performed by the 2D engine 841, or substituted at display time by the display controller 843 using overlay display planes. In some embodiments, a shared L3 cache 875 is available to all graphics components, allowing the sharing of data without the use of main system memory.

In some embodiments, graphics processor media pipeline 830 includes a media engine 837 and a video front end 834. In some embodiments, video front end 834 receives pipeline commands from the command streamer 803. In some embodiments, media pipeline 830 includes a separate command streamer. In some embodiments, video front-end 834 processes media commands before sending the command to the media engine 837. In some embodiments, media engine 337 includes thread spawning functionality to spawn threads for dispatch to thread execution logic 850 via thread dispatcher 831.

In some embodiments, graphics processor 800 includes a display engine 840. In some embodiments, display engine 840 is external to processor 800 and couples with the graphics processor via the ring interconnect 802, or some other interconnect bus or fabric. In some embodiments, display engine 840 includes a 2D engine 841 and a display controller 843. In some embodiments, display engine 840 contains special purpose logic capable of operating independently of the 3D pipeline. In some embodiments, display controller 843 couples with a display device (not shown), which may be a system integrated display device, as in a laptop computer, or an external display device attached via a display device connector.

In some embodiments, graphics pipeline 820 and media pipeline 830 are configurable to perform operations based on multiple graphics and media programming interfaces and are not specific to any one application programming interface (API). In some embodiments, driver software for the graphics processor translates API calls that are specific to a particular graphics or media library into commands that can be processed by the graphics processor. In some embodiments, support is provided for the Open Graphics Library (OpenGL) and Open Computing Language (OpenCL) from the Khronos Group, the Direct3D library from the Microsoft Corporation, or support may be provided to both OpenGL and D3D. Support may also be provided for the Open Source Computer Vision Library (OpenCV). A future API with a compatible 3D pipeline would also be supported if a mapping can be made from the pipeline of the future API to the pipeline of the graphics processor.

Graphics Pipeline Programming

Figure 9A:
FIG. 9A is a block diagram illustrating a graphics processor command format according to an embodiment and FIG. 9B is a block diagram illustrating a graphics processor command sequence according to an embodiment.
Figure 9B:
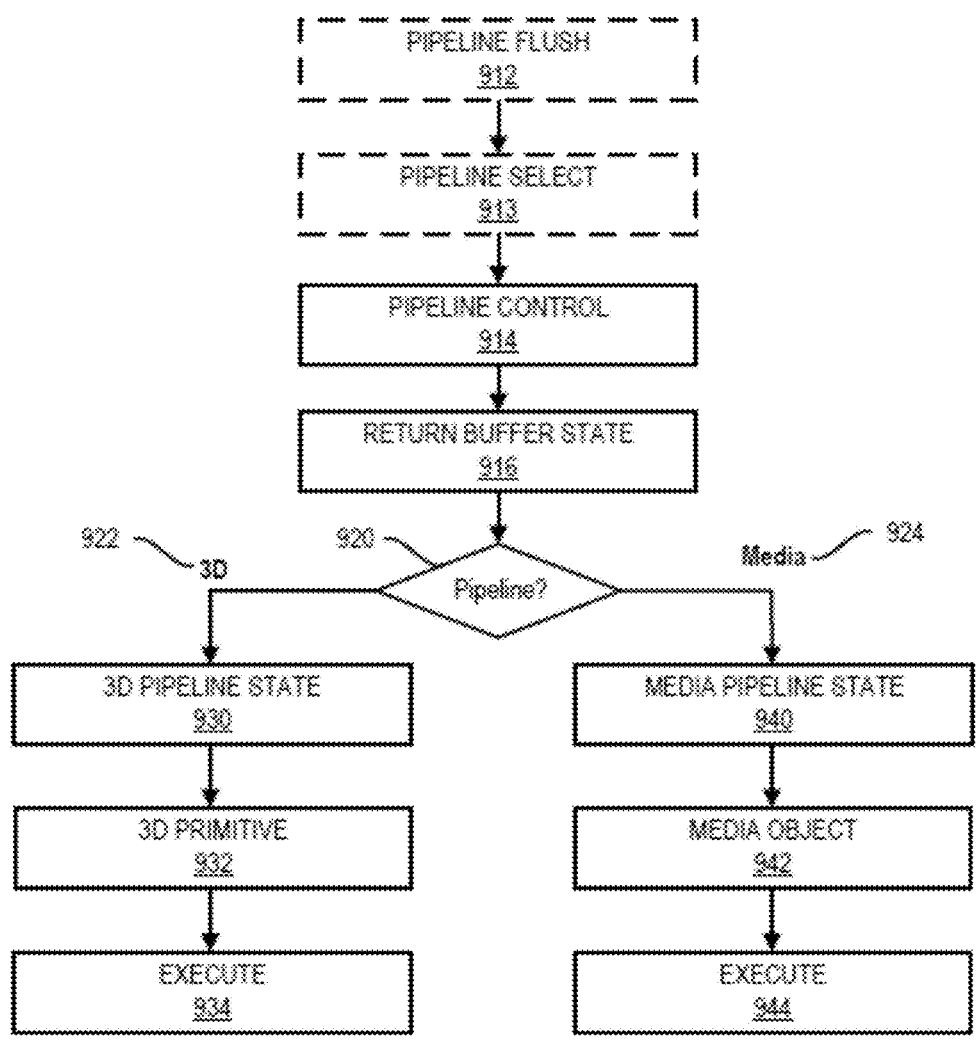

FIG. 9A is a block diagram illustrating a graphics processor command format 900 according to some embodiments. FIG. 9B is a block diagram illustrating a graphics processor command sequence 910 according to an embodiment. The solid lined boxes in FIG. 9A illustrate the components that are generally included in a graphics command while the dashed lines include components that are optional or that are only included in a sub-set of the graphics commands. The exemplary graphics processor command format 900 of FIG. 9A includes data fields to identify a target client 902 of the command, a command operation code (opcode) 904, and the relevant data 906 for the command. A sub-opcode 905 and a command size 908 are also included in some commands.

In some embodiments, client 902 specifies the client unit of the graphics device that processes the command data. In some embodiments, a graphics processor command parser examines the client field of each command to condition the further processing of the command and route the command data to the appropriate client unit. In some embodiments, the graphics processor client units include a memory interface unit, a render unit, a 2D unit, a 3D unit, and a media unit. Each client unit has a corresponding processing pipeline that processes the commands. Once the command is received by the client unit, the client unit reads the opcode 904 and, if present, sub-opcode 905 to determine the operation to perform. The client unit performs the command using information in data field 906. For some commands an explicit command size 908 is expected to specify the size of the command. In some embodiments, the command parser automatically determines the size of at least some of the commands based on the command opcode. In some embodiments commands are aligned via multiples of a double word.

The flow diagram in FIG. 9B shows an exemplary graphics processor command sequence 910. In some embodiments, software or firmware of a data processing system that features an embodiment of a graphics processor uses a version of the command sequence shown to set up, execute, and terminate a set of graphics operations. A sample command sequence is shown and described for purposes of example only as embodiments are not limited to these specific commands or to this command sequence. Moreover, the commands may be issued as batch of commands in a command sequence, such that the graphics processor will process the sequence of commands in at least partially concurrence.

In some embodiments, the graphics processor command sequence 910 may begin with a pipeline flush command 912 to cause any active graphics pipeline to complete the currently pending commands for the pipeline. In some embodiments, the 3D pipeline 922 and the media pipeline 924 do not operate concurrently. The pipeline flush is performed to cause the active graphics pipeline to complete any pending commands. In response to a pipeline flush, the command parser for the graphics processor will pause command processing until the active drawing engines complete pending operations and the relevant read caches are invalidated. Optionally, any data in the render cache that is marked 'dirty' can be flushed to memory. In some embodiments, pipeline flush command 912 can be used for pipeline synchronization or before placing the graphics processor into a low power state.

In some embodiments, a pipeline select command 913 is used when a command sequence requires the graphics processor to explicitly switch between pipelines. In some embodiments, a pipeline select command 913 is required only once within an execution context before issuing pipeline commands unless the context is to issue commands for both pipelines. In some embodiments, a pipeline flush command is 912 is required immediately before a pipeline switch via the pipeline select command 913.

In some embodiments, a pipeline control command 914 configures a graphics pipeline for operation and is used to program the 3D pipeline 922 and the media pipeline 924. In some embodiments, pipeline control command 914 configures the pipeline state for the active pipeline. In one embodiment, the pipeline control command 914 is used for pipeline synchronization and to clear data from one or more cache memories within the active pipeline before processing a batch of commands.

In some embodiments, return buffer state commands 916 are used to configure a set of return buffers for the respective pipelines to write data. Some pipeline operations require the allocation, selection, or configuration of one or more return buffers into which the operations write intermediate data during processing. In some embodiments, the graphics processor also uses one or more return buffers to store output data and to perform cross thread communication. In some embodiments, the return buffer state 916 includes selecting the size and number of return buffers to use for a set of pipeline operations.

The remaining commands in the command sequence differ based on the active pipeline for operations. Based on a pipeline determination 920, the command sequence is tailored to the 3D pipeline 922 beginning with the 3D pipeline state 930, or the media pipeline 924 beginning at the media pipeline state 940.

The commands for the 3D pipeline state 930 include 3D state setting commands for vertex buffer state, vertex element state, constant color state, depth buffer state, and other state variables that are to be configured before 3D primitive commands are processed. The values of these commands are determined at least in part based the particular 3D API in use. In some embodiments, 3D pipeline state 930 commands are also able to selectively disable or bypass certain pipeline elements if those elements will not be used.

In some embodiments, 3D primitive 932 command is used to submit 3D primitives to be processed by the 3D pipeline. Commands and associated parameters that are passed to the graphics processor via the 3D primitive 932 command are forwarded to the vertex fetch function in the graphics pipeline. The vertex fetch function uses the 3D primitive 932 command data to generate vertex data structures. The vertex data structures are stored in one or more return buffers. In some embodiments, 3D primitive 932 command is used to perform vertex operations on 3D primitives via vertex shaders. To process vertex shaders, 3D pipeline 922 dispatches shader execution threads to graphics processor execution units.

In some embodiments, 3D pipeline 922 is triggered via an execute 934 command or event. In some embodiments, a register write triggers command execution. In some embodiments execution is triggered via a 'go' or 'kick' command in the command sequence. In one embodiment command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

In some embodiments, the graphics processor command sequence 910 follows the media pipeline 924 path when performing media operations. In general, the specific use and manner of programming for the media pipeline 924 depends on the media or compute operations to be performed. Specific media decode operations may be offloaded to the media pipeline during media decode. In some embodiments, the media pipeline can also be bypassed and media decode can be performed in whole or in part using resources provided by one or more general purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

In some embodiments, media pipeline 924 is configured in a similar manner as the 3D pipeline 922. A set of media pipeline state commands 940 are dispatched or placed into in a command queue before the media object commands 942. In some embodiments, media pipeline state commands 940 include data to configure the media pipeline elements that will be used to process the media objects. This includes data to configure the video decode and video encode logic within the media pipeline, such as encode or decode format. In some embodiments, media pipeline state commands 940 also support the use one or more pointers to "indirect" state elements that contain a batch of state settings.

In some embodiments, media object commands 942 supply pointers to media objects for processing by the media pipeline. The media objects include memory buffers containing video data to be processed. In some embodiments, all media pipeline states must be valid before issuing a media object command 942. Once the pipeline state is configured and media object commands 942 are queued, the media pipeline 924 is triggered via an execute command 944 or an equivalent execute event (e.g., register write). Output from media pipeline 924 may then be post processed by operations provided by the 3D pipeline 922 or the media pipeline 924. In some embodiments, GPGPU operations are configured and executed in a similar manner as media operations.

Graphics Software Architecture

Figure 10:
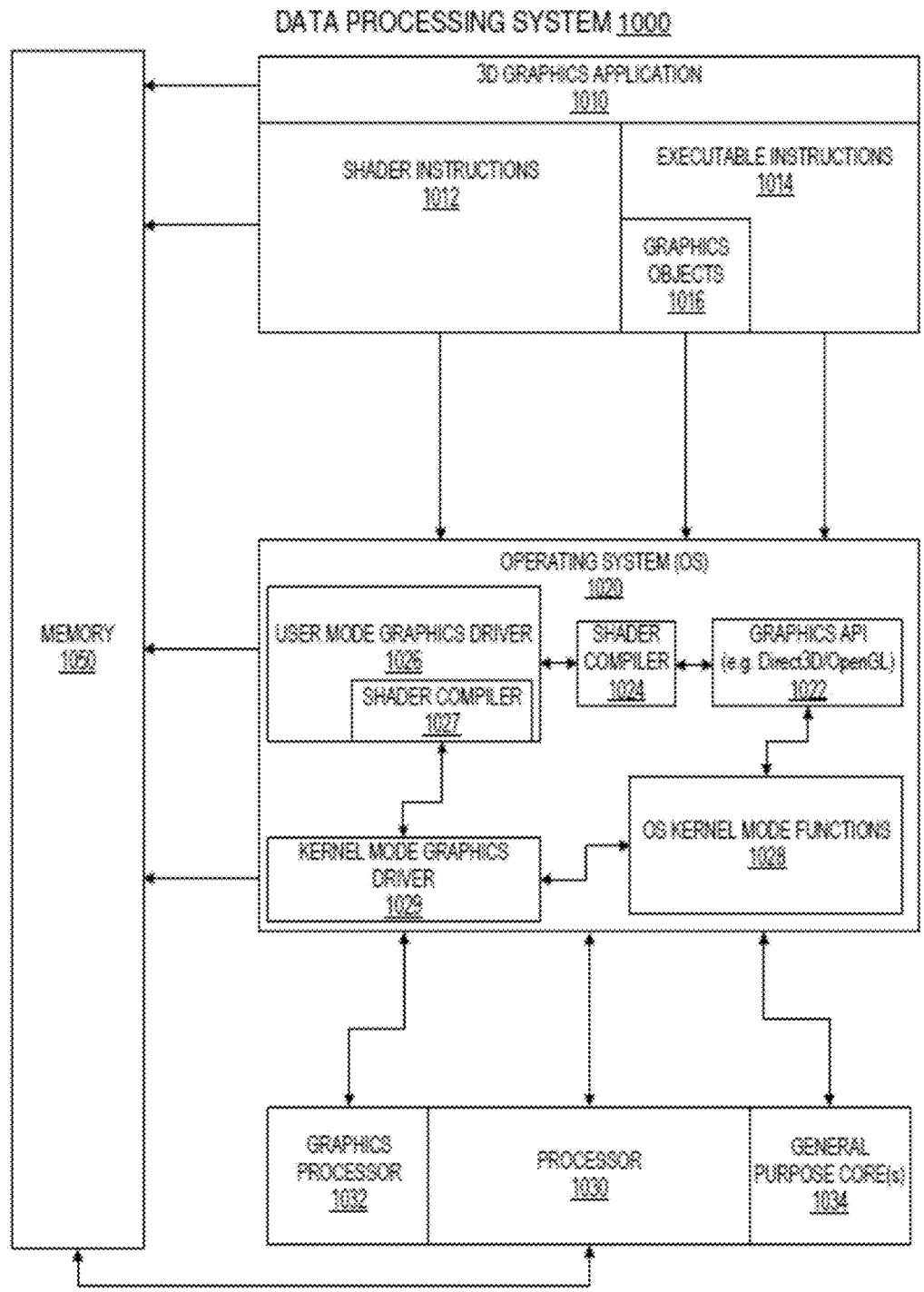
FIG. 10 illustrates exemplary graphics software architecture for a data processing system according to an embodiment.

FIG. 10 illustrates exemplary graphics software architecture for a data processing system 1000 according to some embodiments. In some embodiments, software architecture includes a 3D graphics application 1010, an operating system 1020, and at least one processor 1030. In some embodiments, processor 1030 includes a graphics processor 1032 and one or more general-purpose processor core(s) 1034. The graphics application 1010 and operating system 1020 each execute in the system memory 1050 of the data processing system.

In some embodiments, 3D graphics application 1010 contains one or more shader programs including shader instructions 1012. The shader language instructions may be in a high-level shader language, such as the High Level Shader Language (HLSL) or the OpenGL Shader Language (GLSL). The application also includes executable instructions 1014 in a machine language suitable for execution by the general-purpose processor core 1034. The application also includes graphics objects 1016 defined by vertex data.

In some embodiments, operating system 1020 is a Microsoft® Windows® operating system from the Microsoft Corporation, a proprietary UNIX-like operating system, or an open source UNIX-like operating system using a variant of the Linux kernel. When the Direct3D API is in use, the operating system 1020 uses a front-end shader compiler 1024 to compile any shader instructions 1012 in HLSL into a lower-level shader language. The compilation may be a just-in-time (JIT) compilation or the application can perform shader pre-compilation. In some embodiments, high-level shaders are compiled into low-level shaders during the compilation of the 3D graphics application 1010.

In some embodiments, user mode graphics driver 1026 contains a back-end shader compiler 1027 to convert the shader instructions 1012 into a hardware specific representation. When the OpenGL API is in use, shader instructions 1012 in the GLSL high-level language are passed to a user mode graphics driver 1026 for compilation. In some embodiments, user mode graphics driver 1026 uses operating system kernel mode functions 1028 to communicate with a kernel mode graphics driver 1029. In some embodiments, kernel mode graphics driver 1029 communicates with graphics processor 1032 to dispatch commands and instructions.

IP Core Implementations

One or more aspects of at least one embodiment may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

Figure 11:
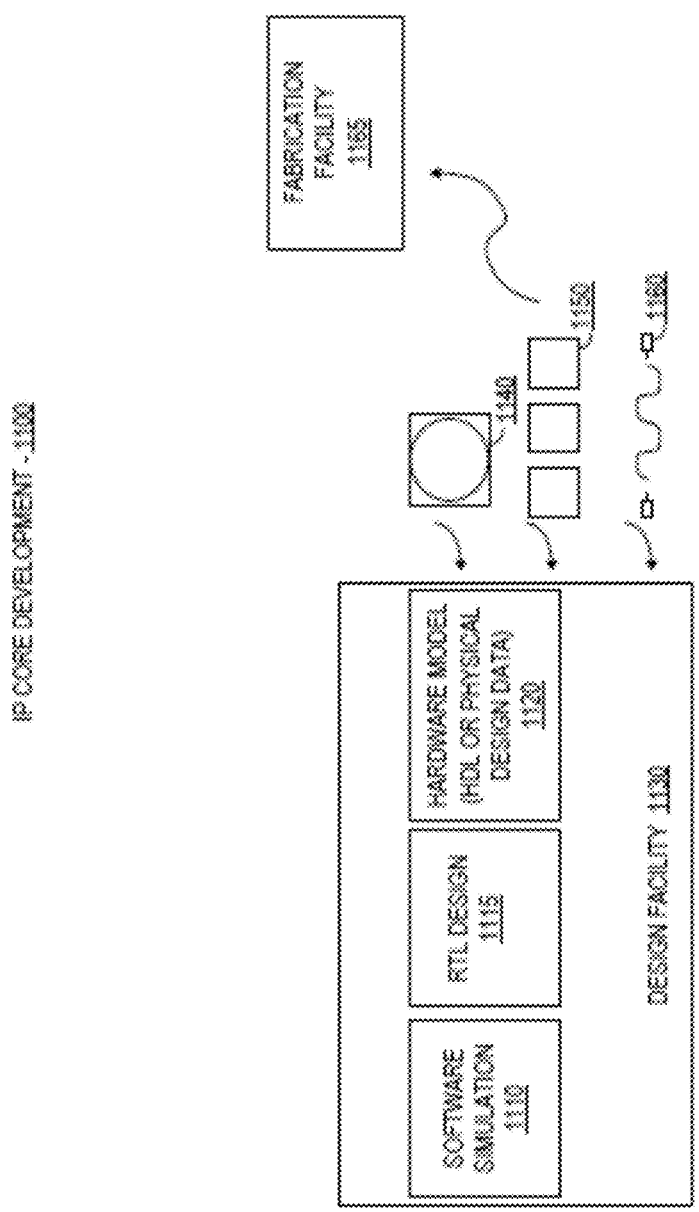
FIG. 11 11 is a block diagram illustrating an IP core development system that may be used to manufacture an integrated circuit to perform operations according to an embodiment.

FIG. 11 is a block diagram illustrating an IP core development system 1100 that may be used to manufacture an integrated circuit to perform operations according to an embodiment. The IP core development system 1100 may be used to generate modular, re-usable designs that can be incorporated into a larger design or used to construct an entire integrated circuit (e.g., an SOC integrated circuit). A design facility 1130 can generate a software simulation 1110 of an IP core design in a high level programming language (e.g., C/C++). The software simulation 1110 can be used to design, test, and verify the behavior of the IP core. A register transfer level (RTL) design can then be created or synthesized from the simulation model 1100. The RTL design 1115 is an abstraction of the behavior of the integrated circuit that models the flow of digital signals between hardware registers, including the associated logic performed using the modeled digital signals. In addition to an RTL design 1115, lower-level designs at the logic level or transistor level may also be created, designed, or synthesized. Thus, the particular details of the initial design and simulation may vary.

The RTL design 1115 or equivalent may be further synthesized by the design facility into a hardware model 1120, which may be in a hardware description language (HDL), or some other representation of physical design data. The HDL may be further simulated or tested to verify the IP core design. The IP core design can be stored for delivery to a $3^{rd}$ party fabrication facility 1165 using non-volatile memory 1140 (e.g., hard disk, flash memory, or any non-volatile storage medium). Alternatively, the IP core design may be transmitted (e.g., via the Internet) over a wired connection 1150 or wireless connection 1160. The fabrication facility 1165 may then fabricate an integrated circuit that is based at least in part on the IP core design. The fabricated integrated circuit can be configured to perform operations in accordance with at least one embodiment described herein.

Figure 12:
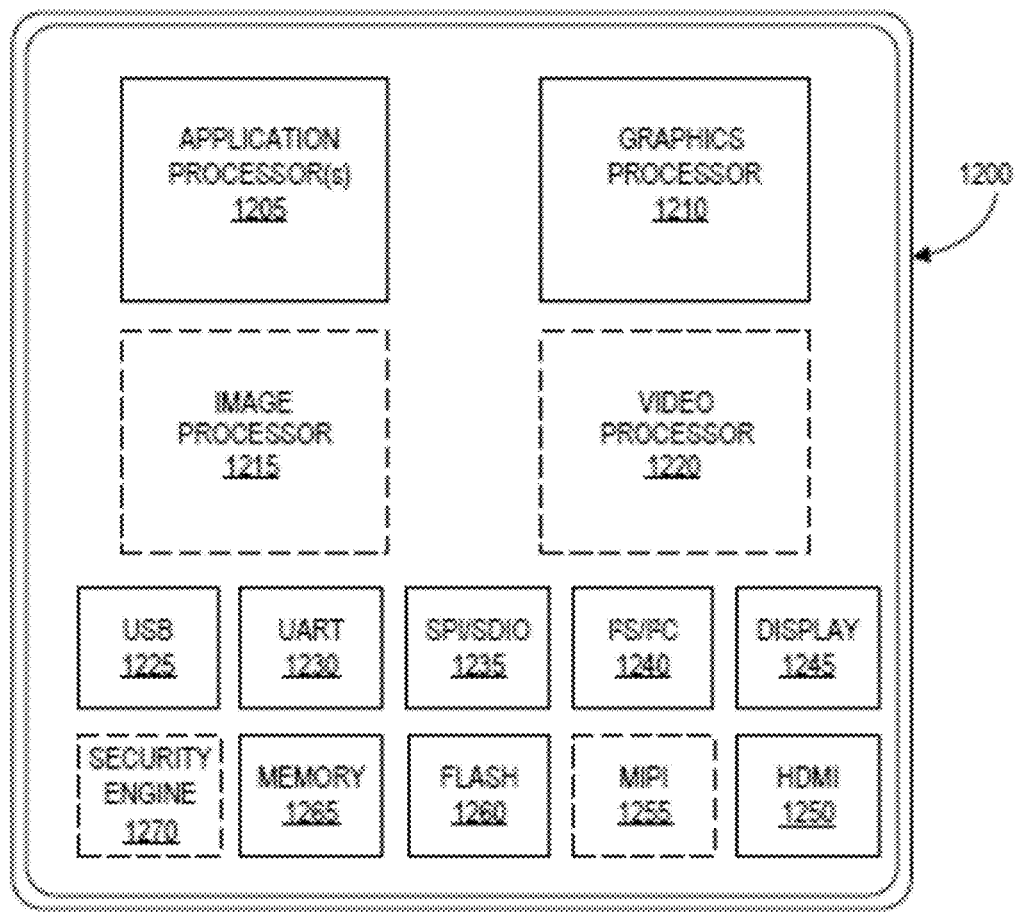
FIG. 12 is a block diagram illustrating an exemplary system on a chip integrated circuit that may be fabricated using one or more IP cores, according to an embodiment.

FIG. 12 is a block diagram illustrating an exemplary system on a chip integrated circuit 1200 that may be fabricated using one or more IP cores, according to an embodiment. The exemplary integrated circuit includes one or more application processors 1205 (e.g., CPUs), at least one graphics processor 1210, and may additionally include an image processor 1215 and/or a video processor 1220, any of which may be a modular IP core from the same or multiple different design facilities. The integrated circuit includes peripheral or bus logic including a USB controller 1225, UART controller 1230, an SPI/SDIO controller 1235, and an I²S/I²C controller 1240. Additionally, the integrated circuit can include a display device 1245 coupled to one or more of a high-definition multimedia interface (HDMI) controller 1250 and a mobile industry processor interface (MIPI) display interface 1255. Storage may be provided by a flash memory subsystem 1260 including flash memory and a flash memory controller. Memory interface may be provided via a memory controller 1265 for access to SDRAM or SRAM memory devices. Some integrated circuits additionally include an embedded security engine 1270.

Additionally, other logic and circuits may be included in the processor of integrated circuit 1200, including additional graphics processors/cores, peripheral interface controllers, or general purpose processor cores.

Typical High-Level 3D Rendering Workflow

Figure 13:
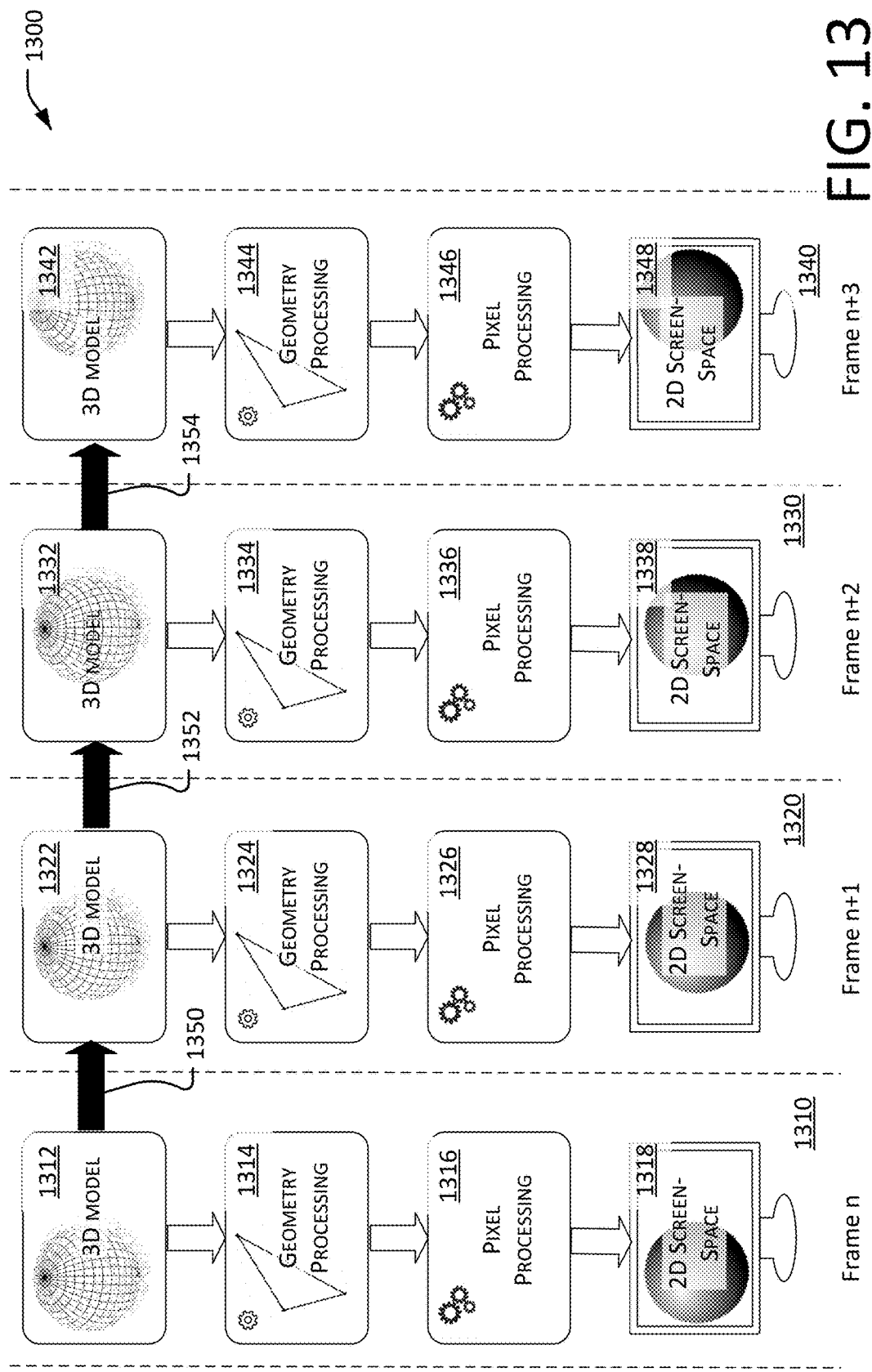
FIG. 13 illustrates a conventional high-level 3D rendering workflow of an example frame sequence.

FIG. 13 shows an example of a conventional high-level 3D rendering workflow 1300 based upon a short sequence of frames, which are shown from left to right as frame 1310, 1320, 1330, and 1340. This workflow/frame-sequence 1300 illustrates, at a high level, how a typical 3D rendering is performed for each frame of a sequence.

Using this conventional high-level 3D rendering workflow 1300, a computer graphics system (e.g., GPU) produces a fully 3D rendered frame for each of the frames in the sequence. In a real-time scenario, then the system must produce these frames fast enough (e.g., 30-60 frames per second) to create a seamless and smooth visual environment for the viewer.

Frame 1310 is labeled "Frame n" in this sequence. Alternatively, it could be labeled frame 0 or frame at $t_0$. That is, this frame 1310 is the first frame of this example frame sequence.

With regard to frame 1310, the 3D rendering starts with a 3D model 1312. The 3D model 1312 describes the geometry information of the objects in a 3D scene of that frame. That geometry information includes vertices that define the shape of 3D objects in the form of polygons (e.g., triangles). The geometry information of an object is often visualized as a wireframe model of an object. The box representing the 3D model 1312 shows a wireframe sphere on the left-hand side of that box. The wireframe sphere is an example of a 3D object that is represented as a collection of vertices of polygons.

Next, geometry processing 1314 is performed on the 3D model 1312. The geometry processing 1314 commonly includes vertex shader modules (which are hardware and/or software). Vertex shaders operate in 3D space. Vertex shaders manipulate properties such as position, color, and texture coordinate.

Next, pixel processing 1316 calculates the effects on a per-pixel basis of the resulting 2D screen-space projection, including the pixels that represent the objects handled by the geometry processing 1314. Depending upon the screen resolution, typically more than two million pixels may need to be rendered, lit, shaded, and colored per frame. That pixel processing 1316 does that processing for frame 1310. The pixel processing 1316 commonly includes pixel shader modules (which are hardware and/or software).

2D screen-space projection 1318 represents the 2D screen-space projection of the fully 3D rendered 3D model 1312. In the case of real-time graphics, this frame is quickly displayed on the screen in the proper sequence and with the proper timing. The 2D screen-space projection 1318 is illustrated to be displayed on a computer graphics screen (e.g., television monitor). This is done to show the real-time nature of the 3D rendering performed by the computer graphics system.

As depicted, the 2D screen-space projection 1318 shows a solid colored sphere on the left-hand size of the screen. This is intended to match the wireframe sphere shown in the 3D model 1312 and illustrate the effect of 3D rendering.

The next frame is frame 1320. Frame 1320 is labeled "Frame n+1" to indicate the next frame in the frame sequence. Except for some of the information about the previous 3-D model (e.g., 3D model 1312), the processing of this frame starts anew. The retained and transformed information about the previous 3D model is shown by arrow 1350.

Frame 1320 is produced using the same process as the one before it. It starts with a 3D model 1322. Geometry processing 1324 and pixel processing 1326 is performed on the model 1322. This produces 2D screen-space projection 1328. This frame is shown with the proper timing right after the frame before it (e.g., frame 1310).

The next frame is frame 1330. This frame is labeled "Frame n+2" to indicate the next frame in the frame sequence. Except for some of the information about the previous 3-D model (e.g., 3D model 1322), the processing of this frame starts anew. The retained and transformed information about the previous 3D model is shown by arrow 1352.

Frame 1330 is produced using the same process as the frames before it. It starts with a 3D model 1332. Geometry processing 1334 and pixel processing 1336 is performed on the model 1332. This produces 2D screen-space projection 1338. This frame is shown with the proper timing right after the frame before it (e.g., frame 1330).

The last frame of this snippet of a frame sequence is frame 1340. This frame is labeled "Frame n+3" to indicate the next frame in the frame sequence. Except for some of the information about the previous 3-D model (e.g., 3D model 1332), the processing of this frame starts anew. The retained and transformed information about the previous 3D model is shown by arrow 1354.

Frame 1340 is produced using the same process as the frames before it. It starts with a 3D model 1342. Geometry processing 1344 and pixel processing 1346 is performed on the model 1342. This produces 2D screen-space projection 1348. This frame is shown with the proper timing right after the frame before it (e.g., frame 1340).

To better illustrate the frame sequence (or a portion thereof), each frame has a wireframe sphere shown in the box that represents its 3D model. Also, each frame has a solid sphere shown in the box that represents is 2D screen-space projection. Across the frame sequence portion, the wireframe and solid spheres are shown to move from left to right (within their respective boxes) in a corresponding manner.

As depicted, the coordinated wireframe-solid sphere movement across frames is meant to convey that objects (and/or the viewer's perspective) changes from frame to frame with real-time computer graphics.

Example High-Level 3D Rendering Workflow with Bi-Directional 2D Morphing

Figure 14:
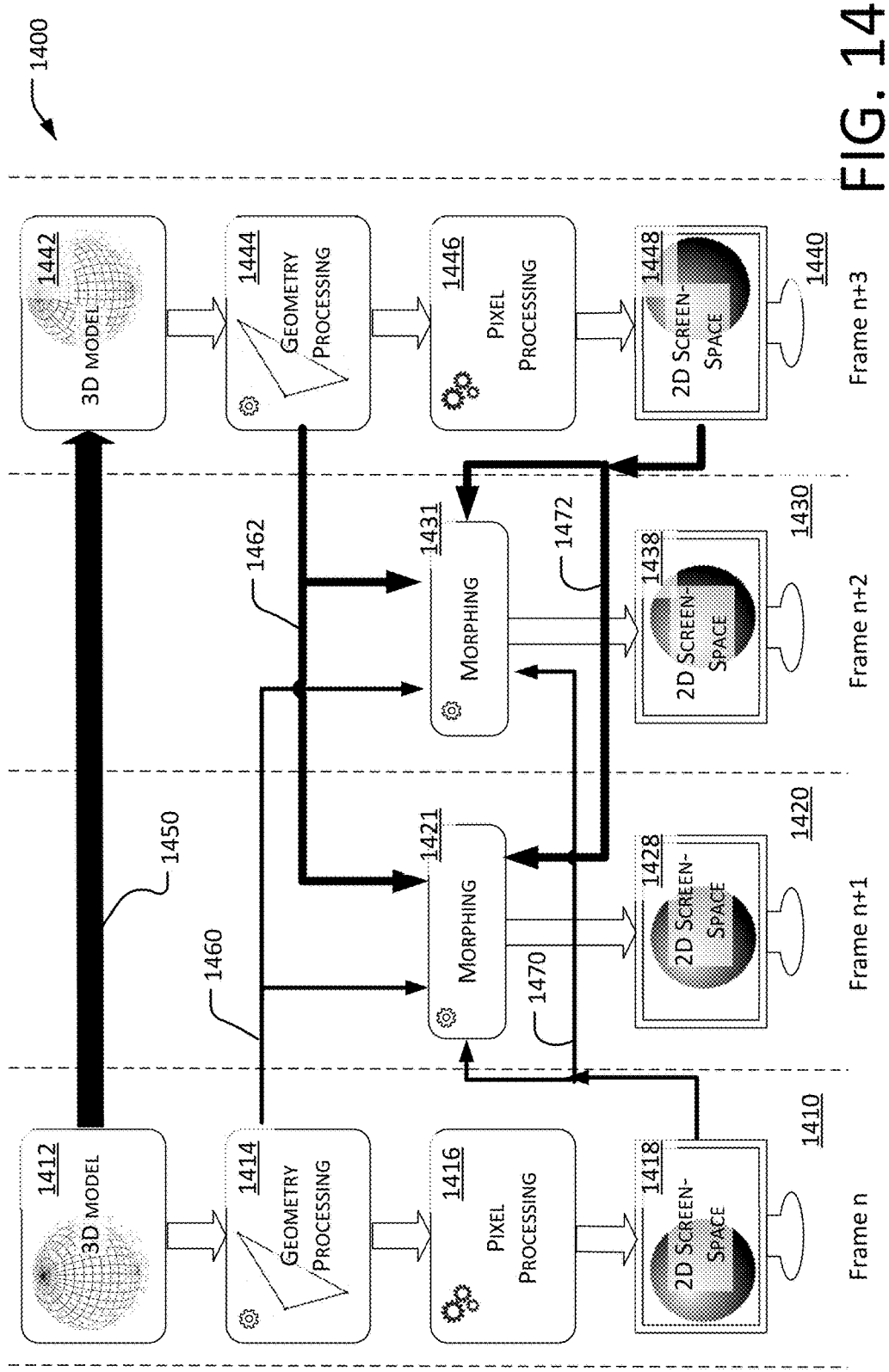
FIG. 14 illustrates an example high-level 3D rendering workflow with bi-directional 2D morphing in accordance with implementations as described herein.

FIG. 14 shows an example of a high-level 3D rendering workflow 1400 that incorporates one or more implementations of the technology described herein. In particular, the workflow 1400 includes bi-directional 2D morphing to generate interleaved 2D screen-space projections between fully 3D rendered frames.

Like the discussion about the conventional high-level 3D rendering workflow 1300, this discussion is based on a similar short sequence of frames, which are shown from left to right as frame 1410, 1420, 1430, and 1440. Each of these frames corresponds to similarly situated and numbered frames (e.g., 1310, 1320, 1330, and 1340) of the conventional workflow/sequence 1300 discussed above.

However, unlike the conventional workflow/sequence 1300, a computer graphics system (e.g., GPU) produces a fully 3D rendered frame for only the first and the last frames (e.g., 1410 and 1440) of this example workflow/sequence 1400. Using information derived from the already fully 3D rendered frames 1410 and 1440, the computer graphics system calculates the intermediate frames (e.g., 1420 and 1430) in accordance with the new technologies described herein.

Frame 1410 is labeled "Frame n" in this sequence. Alternatively, it could be labeled frame 0 or frame at $t_0$. That is, this frame 1410 is the first frame of this example frame sequence. Frame 1440 is labeled "Frame n+3" in this sequence. It is effectively the last frame of the example sequence. That said, without an implementation of the new technology, frames 1410 and 1440 would be the only frames of the sequence.

For each of these frames 1410 and 1440, the 3D rendering starts with a 3D model (e.g., 1412 and 1442). Arrow 1450 indicates that some of the information about the previous 3-D model (e.g., 3D model 1412) is transferred to the next fully 3D rendered frame, which is frame 1440.

For each of the fully 3D rendered frames 1410 and 1440, the computer graphics system performs geometry processing (e.g., 1414 and 1444) on their 3D model. For each of the frames 1410 and 1440, the computer graphics system performs pixel processing (e.g., 1416 and 1446) and calculates the effects on a per-pixel basis of the resulting 2D screen-space projection.

The conventional full 3D rendering process produces a 2D screen-space projection (e.g., 1418 and 1448) for each of the fully 3D rendered frames 1410 and 1440.

In this example workflow/sequence 1400, there are two frames (1420 and 1430) that occur between the fully 3D rendered frames 1410, 1440. Instead of being fully 3D rendered, these frames 1420 and 1430 are morphed from information available from fully 3D rendered frames 1410, 1440.

With frame 1420, a morph processing 1421 obtains geometry information from the geometry processing 1414 of frame 1410 (which is the immediately preceding frame) and from the geometry processing 1444 of frame 1440 (which is a later or succeeding frame). This is depicted by arrows 1460 and 1462 respectively. In particular, the morph processing 1431 uses this geometry information to determine the motion of 2D projections of 3D model primitives (i.e. triangles).

Also, the morph processing 1421 obtains pixel information from the completed 2D screen-space projection 1418 of frame 1410 (which is the immediately preceding frame) and from the completed 2D screen-space projection 1418 of frame 1440 (which is a later or succeeding frame). This is depicted by arrows 1470 and 1472 respectively.

With frame 1430, a morph processing 1431 obtains geometry information from the geometry processing 1414 of frame 1410 (which is an earlier or preceding frame) and from the geometry processing 1444 of frame 1440 (which is the immediately succeeding frame). This is depicted by arrows 1460 and 1462 respectively. In particular, the morph processing 1431 uses this geometry information to determine the motion of 2D screen-space projection triangles between subsequent frames (e.g., frame 1410 and 1440).

Also, the morph processing 1421 obtains pixel information from the completed 2D screen-space projection 1418 of frame 1410 (which is an earlier or preceding frame) and from the completed 2D screen-space projection 1418 of frame 1440 (which is the immediately succeeding frame). This is depicted by arrows 1470 and 1472 respectively.

The morph processing 1421 and 1431 involves use of pixel data (e.g., color) of actual pixels in 2D screen-space projection based on motion vector calculations and segmentation. The morph processing includes using the color values of the surrounding frames (e.g., 1410 and 1440) from the coordinates obtained from adding the segmented motion vector to the current pixel coordinates. This stage the output color is interpolated between the two values (e.g. using distance-weighted sum). This provides good approximations of surface lighting and/or special effect change in the morphed frame.

Also, morph processing utilizes information from the stencil buffer to handle situations where one or the surrounding frames have incomplete information for an effective morphing. This occurs when objects of the surrounding frames are occluded by objects in the other frame.

For at least one or more implementations, this stencil buffer is a special/dedicated stencil buffer that is specific to the implementation and maintained by an extra step that is part of the full-rendering a surrounding frame. A computer graphics system (e.g., GPU) and 3D applications may have other stencil buffers that it uses for other purposes.

As depicted, the 2D screen-space projection 1418 shows a solid colored sphere on the left-hand size of the screen. This is intended to correspond to the wireframe sphere shown in the 3D model 1412 and illustrate the effect of 3D rendering. Similarly, the 2D screen-space projection 1448 shows a solid colored sphere on the right-hand size of the screen. This is intended to correspond to the wireframe sphere shown in the 3D model 1442 and illustrate the effect of 3D rendering.

Frames 1420 and 1430 are not part of the set of fully 3D rendered frames (e.g., 1410 and 1440), they must be generated. To continue a smooth and constituent frame rate, the interposed frames (e.g., frames 1420 and 1430) are placed as equal distance in the frame sequence. For example, frame 1420 is generated as though it occurred at frame n+1. That is, frame 1420 is generated so that it occurs at a time that about a third of the way between when frame 1410 and frame 1440 occur.

With this, the pixels of a triangle in the morphed frame are drawn in the middle (assuming 1:1 fill ratio) of the stretch it made when moving between surrounding frames (e.g. if the pixel which is, say, the middle of a triangle moved one inch to the right when comparing frame n and n+2, then in the morphed frame n+1 we will draw it half an inch to the right from its original position (and will use a blend of its colors in the original and final positions by the way)).

To illustrate this, the solid spheres of the 2D screen-space projections (1418, 1428, 1438, and 1448) are shown traveling across the display on which the screen-spaces would be displayed. The movement or change of the sphere in the interposed frames (e.g., 1420 and 1430) are projected, calculated, or morphed based upon the geometry information from the surrounding frames.

Example Bi-Directional Vertex-Motion Vector Interpolation

Figure 15:
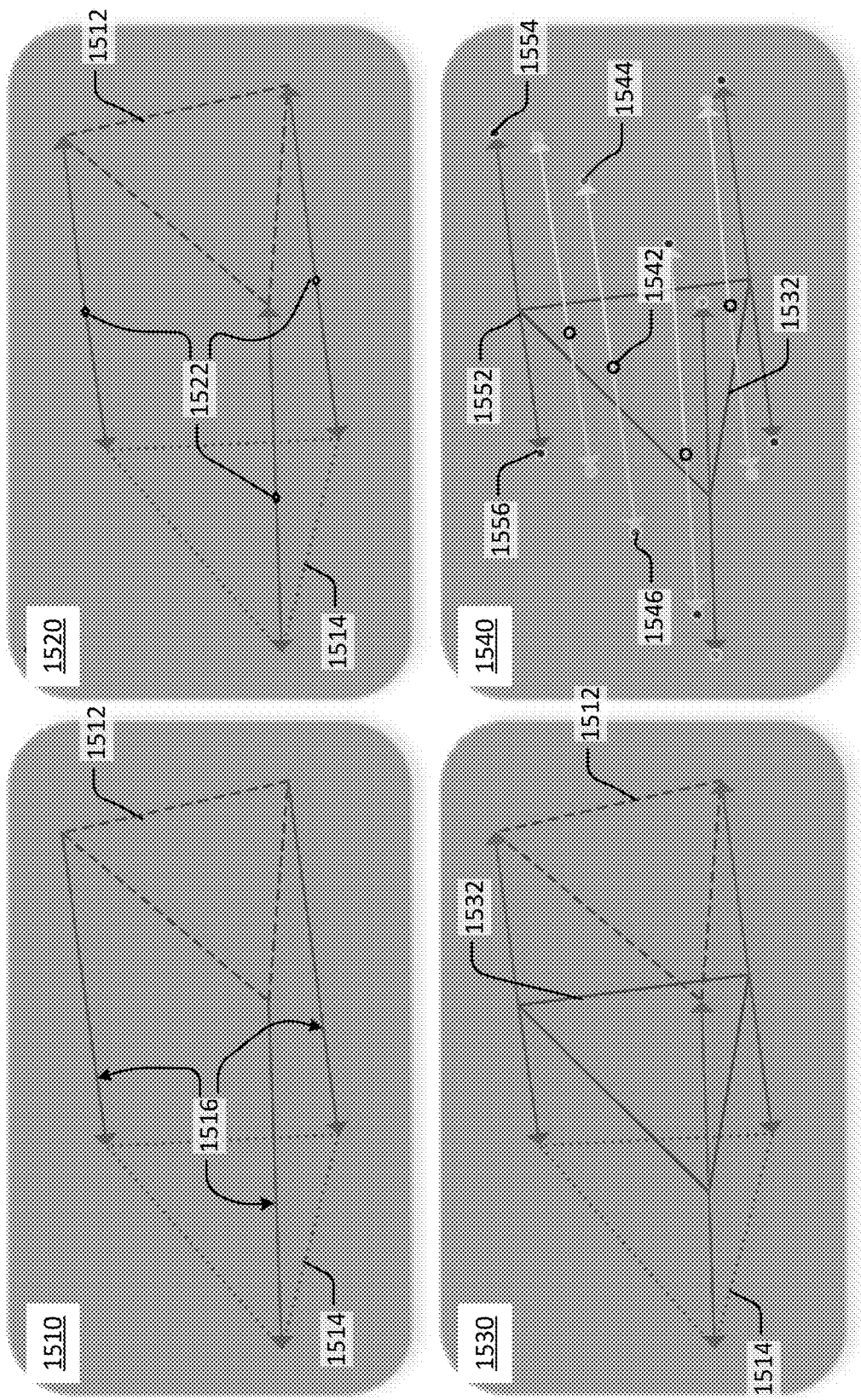
FIG. 15 illustrates examples the operation of an implementation in accordance with implementations as described herein.

FIG. 15 illustrates an example of an implementation of the morphing process in action. In particular, FIG. 15 shows a series of four scenes, which are 2D screen-space projections of a virtual 3D space. Each scene illustrates actions taken by an example implementation of the morph processing.

Scene 1510 shows a triangle 1512 of a before or previous frame (such as frame 1410) and shows that triangle in dashed lines. The scene also shows a triangle 1514 of an after or succeeding frame (such as frame 1440).

In the virtual 3D space, an implementation of the morph processing determines (e.g., computers) motion vectors (such as those labeled 1516 in scene 1510) from the vertices of the triangle 1512 of the before frame to the corresponding vertices of the triangle 1514 of the after frame. These vectors are also called vertex-motion vectors.

As shown in scene 1520, the implementation segments the vertex-motion vectors 1516 at points 1522 into two vectors. These new vertex-motion vectors originate at points 1522 and point towards the surrounding frames. Typically, this segmentation divides the vertex-motion vectors 1516 equally.

While this example shows the vertex-motion vector being divided into two equal segments (or new vectors), other implementations may divide the vertex-motion vectors into more than two equally spaced segments. This may be done to insert more than one morphed frame between surrounding frames. These segmented vertex-motion vectors may be called the forward and backward motion vectors.

Scene 1530 shows a new or intermediate triangle 1532 created in a new 2D screen-space projection. The vertices of the intermediate triangle 1532 are the points 1522 the origin points of the segmented motion vectors.

Scene 1540 shows the intermediate triangle 1532 with its segmented motion vectors pointing forward or backward towards its source triangle of the surrounding frames.

Also, scene 1540 shows the pixels of the intermediate triangle 1532 associated with their corresponding segmented motion vectors. Those motion vectors are assocaiont with corresponding pixels of the before and after frame. For example, as shown in scene 1540, pixel 1542 of the intermediate triangle 1532 is associated with its motion vector that points a corresponding pixel 1544 from the before frame (such as 1410) and from corresponding pixel 1546 from the after frame (such as 1440).

The backward and forward motion vectors are used to "shade" the intermediate triangle 1532 with the motion vectors at each pixel (e.g., pixel 1542) interpolated between triangle vertices. For each pixel of the intermediate triangle, the pixel processing uses a pair of backward and forward motion vectors relative to the current position used to calculate the coordinates of the pixel to be copied from the before and after frames, respectively.

Example Motion Vector Processing for Morphing

Figure 16:
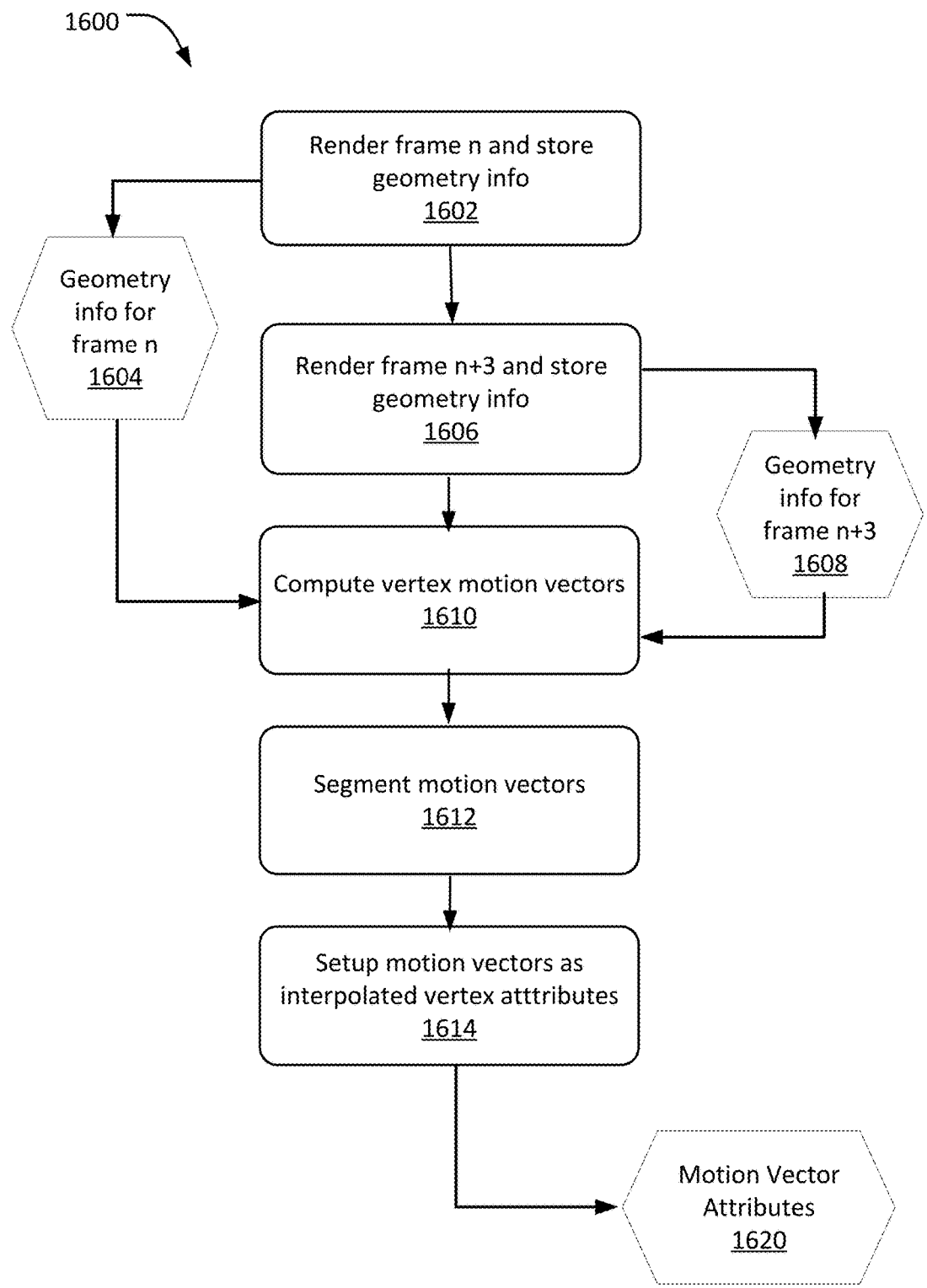
FIG. 16 illustrates a flowchart of an example process in accordance with implementations as described herein.

FIG. 16 shows an example process 1600 illustrating the techniques as described herein to facilitate motion vector processing in accordance with the technologies described herein. The example process 1600 may be implemented (at least in part) with blocks 1414, 1444, 1421, and 1431 of workflow 1400 and on, for example, a computer graphics system (e.g., GPU). This process 1600 may be performed, in part, by a vertex shader (which is hardware alone or a combination of hardware and software).

At block 1602, the computer graphics system renders frame n (e.g., frame 1410) using, for example, conventional full 3D rendering. While this is called frame n here, it may also be called the before, preceding, previous, first, or part of the pair of surrounding 3D rendered frames. The geometry processing (e.g., 1412) portion of the rendering produces geometry information regarding the vertices of frame n. This may also be called geometry stage output. The system stores the geometry information for the rendered frame n at cache 1604.

At block 1606, the computer graphics system renders frame n+3 (e.g., frame 1440) using, for example, conventional full 3D rendering. While this is called frame n+3 here, it may also be called the after, succeeding, current, second, or part of the pair of surrounding 3D rendered frames. The geometry processing (e.g., 1442) portion of the rendering produces geometry information. This may also be called geometry stage output. The system stores the geometry information for the rendered frame n+3 at cache 1608.

The geometry information produced by the rendering of the surrounding frames and used by later portions of this process includes, for example, the vertex coordinates as the relevant vertex attributes. Other attributes include surface normal vectors and vertex lighting, and the like.

At 1610, the system computes vertex-motion vectors based upon the geometry information (e.g., vertex coordinates) obtained from the surrounding pair of frames (from caches 1604 and 1608). As illustrated in scene 1510 of FIG. 15, the system derive (e.g., compute) motion vectors (such as those labeled 1516 in scene 1510) from the vertices of the triangle 1512 of the before frame to the corresponding vertices of the triangle 1514 of the after frame. These vectors are also called vertex-motion vectors.

At 1612, the system segments the computed motion vectors based upon the fill ratio. As illustrated in scene 1520 of FIG. 15, the system divides each of the vertex-motion vectors 1516 at points 1522 into two vectors segments. These new vertex-motion vectors originate at points 1522 and point towards the surrounding frames. Typically, this segmentation divides the vertex-motion vectors 1516 equally.

Fill ratio is the ratio of morphed to fully-rendered frames. For example, a ratio of 1:1 means there is one morphed frame for every two fully rendered frames.

At 1614, the system computes the segmented motion vectors and makes them to be the vertex attributes. They may be described as setting-up backward and forward motion vectors as interpolated vertex attributes. As illustrated in scene 1540 of FIG. 15, the system interpolates vertex attributes of the intermediate triangle 1532 based upon the attributes of the vertices of the corresponding triangles (e.g., 1512 and 1514) of the surrounding frames (e.g., 1410 and 1440). The positions where to read the color information from are interpolated based on the motions vectors; the colors themselves are read from the surrounding frames; in a subsequent stage (i.e., pixel processing) the output color is interpolated form the two read values.

At 1614, the system interpolates motion vectors between vertices; The system uses the interpolated motion vectors to read pixel colors from surrounding frames; then the system calculates a weighted-sum value from the two colors.

At 1620, the system stores (e.g., caches or transfers) the motion vectors as vertex attributes to be later used for determining the per-pixel motion of the morphed frame.

Example Pixel Processing for Morphing

Figure 17:
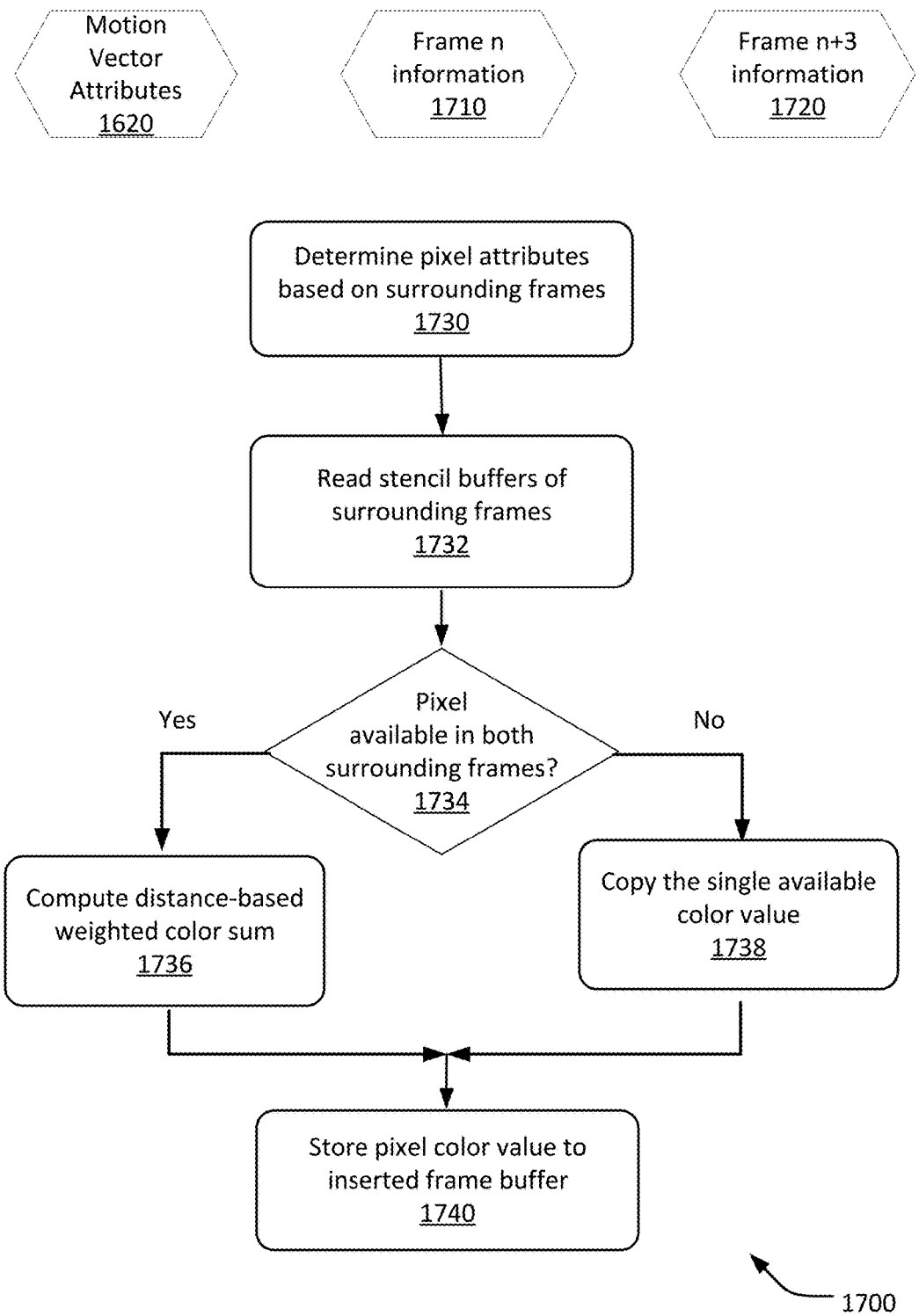
FIG. 17 illustrates a flowchart of an example process in accordance with implementations as described herein.

FIG. 17 shows an example process 1700 illustrating the techniques as described herein to facilitate pixel processing in accordance with the technologies described herein. The example process 1700 may be implemented (at least in part) with blocks 1421 and 1431 of workflow 1400 and on, for example, a computer graphics system (e.g., GPU). This process 1700 may be performed, in part, by a pixel shader (which is hardware alone or a combination of hardware and software).

Data blocks 1620, 1710, and 1720 represent data sources used by this example process 1700. They may be implemented in a cache or memory storage space. Alternatively, they may be received from the hardware that calculates or produces the data. Lines 1460, 1462, 1470, and 1472 represent the morphing process 1421, 1431 accessing data from data blocks 1620, 1710, and 1720.

Data block 1620 is the result of the example process 1600. In particular, data block 1620 includes the motion vectors of the morphed frame. Data blocks 1710 and 1720 include pixel information (e.g., color) from the surrounding frames (e.g., frame n and frame n+3).

At block 1730, the computer graphics system computes the position of the pixels to fetch from the surrounding frames based upon the motion vectors (e.g., from data block 1620). The computer graphics system determines the attributes (e.g., color) of the pixels of the intermediate triangle (e.g., 1532) from corresponding (e.g., fetched) pixels of the before and after frame. For example, as shown in scene 1540 of FIG. 15, the attributes (e.g., color) of pixel 1542 of the intermediate triangle 1532 is interpolated from both the attributes (e.g., color) from corresponding pixel 1544 from the before frame (such as 1410) and the attributes of the corresponding pixel 1546 from the after frame (such as 1440).

Using the motion vectors (e.g., from data block 1620), the system calculates color value for the pixels of the intermediate triangle as a distance-based weighted sum of the backward and forward frame pixel color values to yield smooth color and lighting transition.

At 1732, the system reads stencil buffers of surrounding frames. It may acquire the information of the stencil buffers from the frame information data blocks 1710 and 1720. A stencil buffer maintains information associating pixels with triangles. Therefore, the system can use the stencil buffer information to determine which pixels of the surrounding frames correspond to the pixel of the intermediate triangle.

With the triangle-pixel association information from each of the surrounding frames, the system can determine whether the source triangles (of the surrounding frames) were covered or occluded. If so, then the attributes of one or part of one of the triangles may not exist in the 2D screen-space projection of one of the surrounding frames. In this situation, attribute information for the intermediate triangle of the morphed frame is available from only one triangle of one of the surrounding frames.

Figure 18:
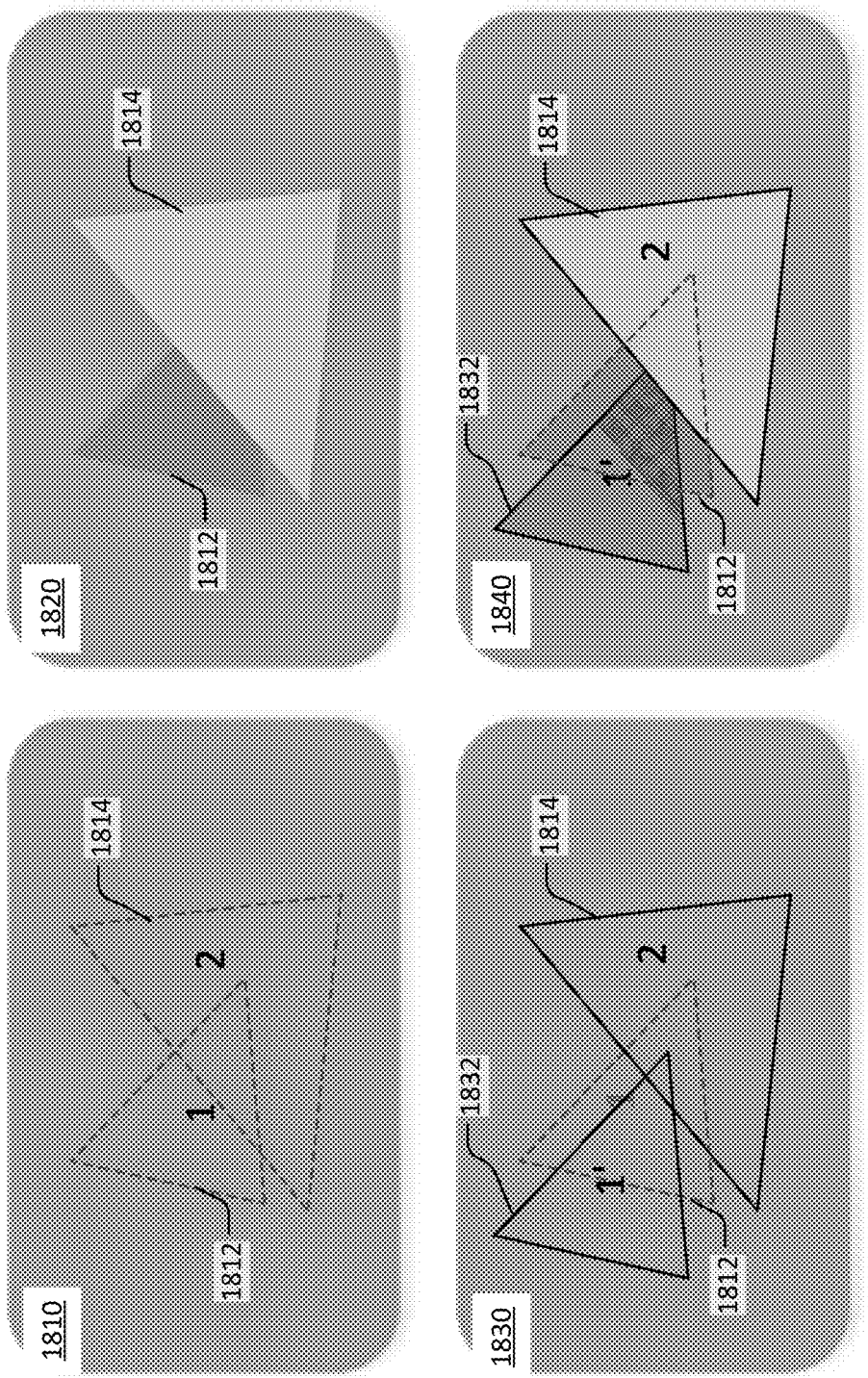
FIG. 18 illustrates an example the operation of an implementation in accordance with implementations as described herein in a particular type of scenario.

FIG. 18 illustrates an example of a scenario where the geometry transformation between frames may cause some areas of a triangle covered by other triangles in the previous frame to become uncovered in the current frame or vice versa. This leads to a case where there are no known pixels that can be copied from one of the backward or the forward frame for the area.

Scene 1810 shows two triangles in dashed lines. Triangles 1812 and 1814 overlap each other. For this example, presume that these triangles are from one the fully rendered frames. They are also labeled 1 and 2, respectively. Scene 1820 shows the same triangles (1812 and 1814) but with shading (i.e., color) as they would appear in a 2D screen-space projection. From this shaded scene, one can tell that triangle 1814 overlaps or obscures the triangle 1812.

Scene 1830 shows the same triangles (1812 and 1814), but it shows another triangle 1832 (labeled 1'). This new triangle 1832 represents a geometry transformation between successive frames.

As shown by scene 1820, the geometry transformation between frames caused some areas of triangle 1812 covered by another triangle (triangle 1814) in the previous frame to become uncovered in the current frame. The appropriate uncovering is shown by the shading and hatching of the triangles shown in scene 1840. This leads to a case where there are no known pixels that can be copied from one of the backward or the forward frame for the area.

In this case, the color value of the one available pixel is copied instead of the weighted sum of color values. To support determining whether both or only one-pixel color values are available a stencil buffer for a per-primitive unique predefined value storing (on successful color buffer writes) is maintained. This predefined value is the same for corresponding geometry primitives in each frame (e.g. draw call number). If the stencil-read value is equal to this predefined value of the currently rendered primitive the pixel is deemed available for copying.

At 1734, the system determines whether a pixel of the intermediate triangle has both corresponding pixels available in the 2D screen-space projection of the surrounding frames. Said differently, the system determines if the stencil values are equal to a predefined value.

If so, then, at block 1736, the system computes distance-based weighted attribute (e.g., color sum) of the both corresponding pixels available in the 2D screen-space projection of the surrounding frames. That is, the system does a form of color blending between the corresponding pixels from the surrounding frames.

Otherwise, then, at block 1738, the system copies the color attribute from the sole corresponding pixel available in the 2D screen-space projection of one of the surrounding frames. Thus, there is no blending or interpolation in this instance.

At block 1740, for each pixel of an intermediate triangle, the system stores the determined attribute value (e.g., color) for that pixel. It does this and inserts it into the frame buffer. When this is done for all of the triangles, then an entire 2D screen-space projection of the morphed frame is created.

The frame buffer the 2D screen-space projection as represented as a bitmap that represents a complete frame of data. This bitmap is driven to a video display of a computer graphics system (e.g., GPU).

Said differently, at block 1740, the system inserts the morphed frame into the frame sequence. For example, it inserts frame 1420 and 1430 between fully rendered frames 1410 and 1440.

Alternatively, FIGS. 16 and 17 may be described in the following manner.

A computer graphics system (e.g., GPU) produces a 2D screen-space projection of a first frame using full three-dimensional (3D) rendering. The 2D screen-space projection of the first frame includes projections of primitives rendered from a 3D model associated with the first frame.

The computer graphics system produces a 2D screen-space projection of a second frame using full 3D rendering. The 2D screen-space projection of the second frame includes projections of primitives rendered from a 3D model associated with the second frame.

The computer graphics system morphs a 2D screen-space projection of one or more intermediate frames based, at least in part, on color attributes associated with 2D screen-space projections of the primitives of both the first and the second frames. The intermediate-frame morphing includes interpolation of the color attributes of 2D screen-space projections of the primitives of each the first and the second frames.

The intermediate-frame morphing is based, at least in part, on geometry information regarding the primitives of the each of the first and second frames. The geometry information includes positions of vertices of the primitives of their frame's associated 2D screen-space projection. The intermediate-frame morphing further includes computing vertex motion vectors from the vertices of the primitives of the first frame's associated 2D screen-space projection to the vertices of corresponding primitives of the second frame's associated 2D screen-space projection.

The intermediate-frame morphing further includes segmenting the vertex motion vectors into multiple motion vectors, each of these segmented motion vectors refers back to its corresponding primitives of either the first frame or the second frame; generating one or more intermediate primitives based on the segmented motion vectors; and interpolating color motion vectors of vertices of the one or more intermediate primitives from vertex attributes of corresponding primitives of the first frame and the second frame.

The intermediate-frame morphing is based, at least in part, on pixel information regarding the primitives of the each of the first and second frames. The pixel information includes color values of pixels of the primitives of their frame's associated 2D screen-space projection. The intermediate-frame morphing further includes interpolating color motion vectors of pixels of the one or more intermediate primitives from pixel attributes of corresponding primitives of the first frame and the second frame. The intermediate-frame morphing further includes: for a particular pixel of the one or more intermediate primitives, determining that a corresponding pixel exists in the 2D screen-space projection of only one of the first and the second frames; and in response to that determination, copying one or more color attributes of the corresponding pixel to the particular pixel of the one or more intermediate primitives.

The computer graphics system displays the first frame, the one or more intermediate frames, and the second frame in that order.

Alternatively still, FIGS. 16 and 17 may be described in the following manner.

A computer graphics system (e.g., GPU) three-dimensionally renders (3D render) a pair of frames to produces a 2D screen-space image for each frame. Each of the 2D screen-space images includes projections of primitives 3D-rendered from a 3D model associated with that frame.

The computer graphics system generates a 2D screen-space projection of an intermediate frame based, at least in part, on attributes of 2D screen-space projections of the primitives of the pair of 3D-rendered frames. The attributes include color values. The intermediate frame is generated without 3D-rendering of that frame.

The generation includes morphing of the attributes of 2D screen-space projections of the primitives of each the pair of 3D-rendered frames. The morphing includes interpolation of the attributes of 2D screen-space projections of the primitives of the pair of 3D-rendered frames.

The computer graphics system presents a sequence of frames on a display with the intermediate frame being presented in the sequence of frames between the presentation of the pair of 3D-rendered frames.

Alternatively, the computer graphics system may generate additional intermediate frames based, at least in part, on attributes of 2D screen-space projections of the primitives of the pair of 3D-rendered frames; and during the presentation of the sequence of frames, insert the additional intermediate frames between the presentation of the pair of 3D-rendered frames.

ADDITIONAL AND ALTERNATIVE IMPLEMENTATION NOTES

To reduce perceived latency, the pixel processing (like that of an example process 1700) for the intermediate and the after (or current) frame can be scheduled in parallel or be executed, at least in part, within the pixel shader of one of the intermediate frames.

An additional level of rendering coarseness/performance control is provided by scaling the size of the interpolated motion vectors buffer vs. the actual frame buffer. A variation of the example process 1600 may use a buffer with edges scaled by half that will result in motion vectors pointing to 2×2 pixel blocks (rather than individual pixels) in the source frames computed at a quarter cost of a per-pixel motion vector buffer.

In the above description of example implementations, for purposes of explanation, specific numbers, materials configurations, and other details are set forth in order to better explain the present invention, as claimed. However, it will be apparent to one skilled in the art that the claimed invention may be practiced using different details than the example ones described herein. In other instances, well-known features are omitted or simplified to clarify the description of the example implementations.

The inventor(s) intend the described example implementations to be primarily examples. The inventor(s) do not intend these example implementations to limit the scope of the appended claims. Rather, the inventor(s) have contemplated that the claimed invention might also be embodied and implemented in other ways, in conjunction with other present or future technologies.

Moreover, the word "example" is used herein to mean serving as an example, instance, or illustration. Any aspect or design described herein as "example" is not necessarily to be construed as preferred or advantageous over other aspects or designs. Rather, use of the word example is intended to present concepts and techniques in a concrete fashion. The term "techniques," for instance, may refer to one or more devices, apparatuses, systems, methods, articles of manufacture, and/or computer-readable instructions as indicated by the context described herein.

As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more," unless specified otherwise or clear from context to be directed to a singular form.

These processes are illustrated as a collection of blocks in a logical flow graph, which represents a sequence of operations that can be implemented in mechanics alone or a combination with hardware, software, and/or firmware. In the context of software/firmware, the blocks represent instructions stored on one or more computer-readable storage media that, when executed by one or more processors, perform the recited operations.

Note that the order in which the processes are described is not intended to be construed as a limitation, and any number of the described process blocks can be combined in any order to implement the processes or an alternate process. Additionally, individual blocks may be deleted from the processes without departing from the spirit and scope of the subject matter described herein.

The term "computer-readable media" includes computer-storage media. For example, computer-storage media may include, but are not limited to, magnetic storage devices (e.g., hard disk, floppy disk, and magnetic strips), optical disks (e.g., compact disk (CD) and digital versatile disk (DVD)), smart cards, flash memory devices (e.g., thumb drive, stick, key drive, and SD cards), and volatile and non-volatile memory (e.g., random access memory (RAM), read-only memory (ROM)).

In the claims appended herein, the inventor invokes 35 U.S.C. §112(f) or paragraph 6 only when the words "means for" or "steps for" are used in the claim. If such words are not used in a claim, then the inventor does not intend for the claim to be construed to cover the corresponding structure, material, or acts described herein (and equivalents thereof) in accordance with 35 U.S.C. 112(f) or paragraph 6.

To the extent various operations or functions are described herein, they can be described or defined as hardware circuitry, software code, instructions, configuration, and/or data. The content can be embodied in hardware logic, or as directly executable software ("object" or "executable" form), source code, high-level shader code designed for execution on a graphics engine, or low-level assembly language code in an instruction set for a specific processor or graphics core. The software content of the embodiments described herein can be provided via an article of manufacture with the content stored thereon, or via a method of operating a communication interface to send data via the communication interface.

A non-transitory machine-readable storage medium can cause a machine to perform the functions or operations described, and includes any mechanism that stores information in a form accessible by a machine (e.g., computing device, electronic system, etc.), such as recordable/non-recordable media (e.g., read-only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface is configured by providing configuration parameters or sending signals to prepare the communication interface to provide a data signal describing the software content. The communication interface can be accessed via one or more commands or signals sent to the communication interface.

Various components described can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc. Besides what is described herein, various modifications can be made to the disclosed embodiments and implementations of the invention without departing from their scope. Therefore, the illustrations and examples herein should be construed in an illustrative, and not a restrictive sense. The scope of the invention should be measured solely by reference to the claims that follow.

The following examples pertain to further embodiments:

EXAMPLE 1

A graphics processing unit (GPU) that facilitates bi-directional morphing of two-dimensional (2D) screen-space projections, the GPU comprising: a graphics processor configured to process computer graphics; a memory configured to operate with the graphics processor; the graphics processor further configured to: produce a 2D screen-space projection of a first frame using full three-dimensional (3D) rendering, wherein the 2D screen-space projection of the first frame includes projections of primitives rendered from a 3D model associated with the first frame; produce a 2D screen-space projection of a second frame using full 3D rendering, wherein the 2D screen-space projection of the second frame includes projections of primitives rendered from a 3D model associated with the second frame; morph a 2D screen-space projection of one or more intermediate frames based, at least in part, on color attributes associated with 2D screen-space projections of the primitives of both the first and the second frames; display the first frame, the one or more intermediate frames, and the second frame in that order.

EXAMPLE 2

A GPU of Example 1, wherein the intermediate-frame morphing includes interpolation of the color attributes of 2D screen-space projections of the primitives of each the first and the second frames.

EXAMPLE 3

A GPU of Example 1, wherein the intermediate-frame morphing is based, at least in part, on geometry information regarding the primitives of the each of the first and second frames.

EXAMPLE 4

A GPU of Example 3, wherein the geometry information includes positions of vertices of the primitives of their frame's associated 2D screen-space projection.

EXAMPLE 5

A GPU of Example 4, wherein the intermediate-frame morphing further includes computing vertex motion vectors from the vertices of the primitives of the first frame's associated 2D screen-space projection to the vertices of corresponding primitives of the second frame's associated 2D screen-space projection.

EXAMPLE 6

A GPU of Example 5, wherein the intermediate-frame morphing further includes: segmenting the vertex motion vectors into multiple motion vectors, each of these segmented motion vectors refers back to its corresponding primitives of either the first frame or the second frame; generating one or more intermediate primitives based on the segmented motion vectors; interpolating motion vectors of vertices of the one or more intermediate primitives from vertex attributes of corresponding primitives of the first frame and the second frame.

EXAMPLE 7

A GPU of Example 1, wherein the intermediate-frame morphing is based, at least in part, on pixel information regarding the primitives of the each of the first and second frames.

EXAMPLE 8

A GPU of Example 7, wherein the pixel information includes color values of pixels of the primitives of their frame's associated 2D screen-space projection.

EXAMPLE 9

A GPU of Example 7, wherein the intermediate-frame morphing further includes interpolating motion vectors of pixels of the one or more intermediate primitives from pixel attributes of corresponding primitives of the first frame and the second frame.

EXAMPLE 10

A GPU of Example 7, wherein the intermediate-frame morphing further includes: for a particular pixel of the one or more intermediate primitives, determining that a corresponding pixel exists in the 2D screen-space projection of only one of the first and the second frames; in response to that determination, copying one or more color attributes of the corresponding pixel to the particular pixel of the one or more intermediate primitives.

EXAMPLE 11

A graphics processing unit (GPU) comprising: a graphics processor configured to process computer graphics; a memory configured to operate with the graphics processor; the graphics processor further configured to: produce a 2D screen-space projection of a first frame using full three-dimensional (3D) rendering, wherein the 2D screen-space projection of the first frame includes projections of primitives rendered from a 3D model associated with the first frame; produce a 2D screen-space projection of a second frame using full 3D rendering, wherein the 2D screen-space projection of the second frame includes projections of primitives rendered from a 3D model associated with the second frame; morph a 2D screen-space projection of one or more intermediate frames based, at least in part, on attributes of 2D screen-space projections of the primitives of both the first and the second frames, wherein the morphing includes interpolation of the attributes of 2D screen-space projections of the primitives of each the first and the second frames; display the first frame, the one or more intermediate frames, and the second frame in that order.

EXAMPLE 12

A GPU of Example 11, wherein the attributes include color values.

EXAMPLE 13

A GPU of Example 11, wherein the intermediate-frame morphing is based, at least in part, on geometry information regarding the primitives of the each of the first and second frames.

EXAMPLE 14

A GPU of Example 13, wherein the geometry information includes positions of vertices of the primitives of their frame's associated 2D screen-space projection.

EXAMPLE 15

A GPU of Example 14, wherein the intermediate-frame morphing further includes computing vertex motion vectors from the vertices of the primitives of the first frame's associated 2D screen-space projection to the vertices of corresponding primitives of the second frame's associated 2D screen-space projection.

EXAMPLE 16

A GPU of Example 15, wherein the intermediate-frame morphing further includes: segmenting the vertex motion vectors into multiple motion vectors, each of these segmented motion vectors refers back to its corresponding primitives of either the first frame or the second frame; generating one or more intermediate primitives based on the segmented motion vectors; interpolating vertex motion vertices of the one or more intermediate primitives from vertex attributes of corresponding primitives of the first frame and the second frame.

EXAMPLE 17

A GPU of Example 11, wherein the intermediate-frame morphing is based, at least in part, on pixel information regarding the primitives of the each of the first and second frames.

EXAMPLE 18

A GPU of Example 17, wherein the pixel information includes color values of pixels of the primitives of their frame's associated 2D screen-space projection.

EXAMPLE 19

A GPU of Example 17, wherein the pixel information includes color of pixels of the primitives of their frame's associated 2D screen-space projection.

EXAMPLE 20

A GPU of Example 17, wherein the intermediate-frame morphing further includes interpolating attributes of pixels of the one or more intermediate primitives from pixel attributes of corresponding primitives of the first frame and the second frame.

EXAMPLE 21

A GPU of Example 17, wherein the intermediate-frame morphing further includes: for a particular pixel of the one or more intermediate primitives, determining that a corresponding pixel exists in the 2D screen-space projection of only one of the first and the second frames; in response to that determination, copying one or more attributes of the corresponding pixel to the particular pixel of the one or more intermediate primitives.

EXAMPLE 22

A graphics processing unit (GPU) comprising: a graphics processor configured to process computer graphics; a memory configured to operate with the graphics processor; the graphics processor further configured to: three-dimensionally render (3D render) a pair of frames to produces a 2D screen-space projection for each frame, wherein each of the 2D screen-space projections includes projections of primitives 3D-rendered from a 3D model associated with that frame; generate a 2D screen-space projection of an intermediate frame based, at least in part, on attributes of 2D screen-space projections of the primitives of the pair of 3D-rendered frames; presenting a sequence of frames on a display, wherein the intermediate frame is presented in the sequence of frames between the presentation of the pair of 3D-rendered frames.

EXAMPLE 23

A GPU of Example 22, wherein the attributes include color values.

EXAMPLE 24

A GPU of Example 22, wherein the graphics processor is further configured to: generate additional intermediate frames based, at least in part, on attributes of 2D screen-space projections of the primitives of the pair of 3D-rendered frames; during the presentation of the sequence of frames, insert the additional intermediate frames between the presentation of the pair of 3D-rendered frames.

EXAMPLE 25

A GPU of Example 22, wherein the intermediate frame is generated without 3D-rendering of that frame.

EXAMPLE 26

A GPU of Example 22, wherein the generating includes morphing of the attributes of 2D screen-space projections of the primitives of each the pair of 3D-rendered frames.

EXAMPLE 27

A GPU of Example 22, wherein the generating includes interpolation of the attributes of 2D screen-space projections of the primitives of the pair of 3D-rendered frames.

EXAMPLE 28

A GPU of Example 22, wherein the intermediate-frame morphing is based, at least in part, on geometry information regarding the primitives of the pair of 3D-rendered frames.

EXAMPLE 29

A GPU of Example 22, wherein the intermediate-frame morphing is based, at least in part, on pixel information regarding the primitives of the each of the first and second frames.

What is claimed is:

1. A graphics processing unit (GPU) that facilitates bi-directional morphing of two-dimensional (2D) screen-space projections, the GPU comprising:
    a graphics processor configured to process computer graphics;
    a memory configured to operate with the graphics processor;
    the graphics processor further configured to:
        produce a 2D screen-space projection of a first frame using full three-dimensional (3D) rendering, wherein the 2D screen-space projection of the first frame includes projections of primitives rendered from a 3D model associated with the first frame;
        produce a 2D screen-space projection of a second frame using full 3D rendering, wherein the 2D screen-space projection of the second frame includes projections of primitives rendered from a 3D model associated with the second frame;
        morph a 2D screen-space projection of one or more intermediate frames based, at least in part, on color attributes associated with 2D screen-space projections of the primitives of both the first and the second frames;
        display the first frame, the one or more intermediate frames, and the second frame in that order.

2. A GPU as recited in claim 1, wherein the intermediate-frame morphing is based, at least in part, on geometry information regarding the primitives of the each of the first and second frames.

3. A GPU as recited in claim 2, wherein the geometry information includes positions of vertices of the primitives of their frame's associated 2D screen-space projection.

4. A GPU as recited in claim 3, wherein the intermediate-frame morphing further includes computing vertex motion vectors from the vertices of the primitives of the first frame's associated 2D screen-space projection to the vertices of corresponding primitives of the second frame's associated 2D screen-space projection.

5. A GPU as recited in claim 4, wherein the intermediate-frame morphing further includes:
    segmenting the vertex motion vectors into multiple motion vectors, each of these segmented motion vectors refers back to its corresponding primitives of either the first frame or the second frame;
    generating one or more intermediate primitives based on the segmented motion vectors;
    interpolating motion vectors of vertices of the one or more intermediate primitives from vertex attributes of corresponding primitives of the first frame and the second frame.

6. A GPU as recited in claim 1, wherein the intermediate-frame morphing is based, at least in part, on pixel information regarding the primitives of the each of the first and second frames.

7. A GPU as recited in claim 6, wherein the pixel information includes color values of pixels of the primitives of their frame's associated 2D screen-space projection.

8. A GPU as recited in claim 6, wherein the intermediate-frame morphing further includes interpolating motion vectors of pixels of the one or more intermediate primitives from pixel attributes of corresponding primitives of the first frame and the second frame.

9. A GPU as recited in claim 6, wherein the intermediate-frame morphing further includes:
for a particular pixel of the one or more intermediate primitives, determining that a corresponding pixel exists in the 2D screen-space projection of only one of the first and the second frames;
in response to that determination, copying one or more color attributes of the corresponding pixel to the particular pixel of the one or more intermediate primitives.

10. A graphics processing unit (GPU) comprising:
a graphics processor configured to process computer graphics;
a memory configured to operate with the graphics processor;
the graphics processor further configured to:
produce a 2D screen-space projection of a first frame using full three-dimensional (3D) rendering, wherein the 2D screen-space projection of the first frame includes projections of primitives rendered from a 3D model associated with the first frame;
produce a 2D screen-space projection of a second frame using full 3D rendering, wherein the 2D screen-space projection of the second frame includes projections of primitives rendered from a 3D model associated with the second frame;
morph a 2D screen-space projection of one or more intermediate frames based, at least in part, on color values of 2D screen-space projections of the primitives of both the first and the second frames, wherein the morphing is based, at least in part, on geometry information regarding the primitives of the each of the first and second frames e;
display the first frame, the one or more intermediate frames, and the second frame in that order.

11. A GPU as recited in claim 10, wherein the geometry information includes positions of vertices of the primitives of their frame's associated 2D screen-space projection.

12. A GPU as recited in claim 11, wherein the intermediate-frame morphing further includes computing vertex motion vectors from the vertices of the primitives of the first frame's associated 2D screen-space projection to the vertices of corresponding primitives of the second frame's associated 2D screen-space projection.

13. A GPU as recited in claim 12, wherein the intermediate-frame morphing further includes:
segmenting the vertex motion vectors into multiple motion vectors, each of these segmented motion vectors refers back to its corresponding primitives of either the first frame or the second frame;
generating one or more intermediate primitives based on the segmented motion vectors;
interpolating vertex motion vertices of the one or more intermediate primitives from vertex attributes of corresponding primitives of the first frame and the second frame.

14. A GPU as recited in claim 10, wherein the intermediate-frame morphing is based, at least in part, on pixel information regarding the primitives of the each of the first and second frames and the intermediate-frame morphing further includes:
for a particular pixel of the one or more intermediate primitives, determining that a corresponding pixel exists in the 2D screen-space projection of only one of the first and the second frames;
in response to that determination, copying one or more attributes of the corresponding pixel to the particular pixel of the one or more intermediate primitives.

15. A graphics processing unit (GPU) comprising:
a graphics processor configured to process computer graphics;
a memory configured to operate with the graphics processor;
the graphics processor further configured to:
three-dimensionally render (3D render) a pair of frames to produces a 2D screen-space projection for each frame, wherein each of the 2D screen-space projections includes projections of primitives 3D-rendered from a 3D model associated with that frame;
generate a 2D screen-space projection of an intermediate frame based, at least in part, on attributes of 2D screen-space projections of the primitives of the pair of 3D-rendered frames;
presenting a sequence of frames on a display, wherein the intermediate frame is presented in the sequence of frames between the presentation of the pair of 3D-rendered frames.

16. A GPU as recited in claim 15, wherein the attributes include color values.

17. A GPU as recited in claim 15, wherein the graphics processor is further configured to:
generate additional intermediate frames based, at least in part, on attributes of 2D screen-space projections of the primitives of the pair of 3D-rendered frames;
during the presentation of the sequence of frames, insert the additional intermediate frames between the presentation of the pair of 3D-rendered frames.

18. A GPU as recited in claim 15, wherein the intermediate frame is generated without 3D-rendering of that frame.

19. A GPU as recited in claim 15, wherein the generating includes morphing of the attributes of 2D screen-space projections of the primitives of each the pair of 3D-rendered frames.

20. A GPU as recited in claim 15, wherein the intermediate-frame morphing is based, at least in part, on geometry information and pixel information regarding the primitives of the pair of 3D-rendered frames.

* * * * *